(12) United States Patent
Chandrashekhara et al.

(10) Patent No.: US 10,853,389 B2
(45) Date of Patent: Dec. 1, 2020

(54) EFFICIENT SNAPSHOT ACTIVATION

(71) Applicant: EMC IP Holding Company LLC, Hopkinton, MA (US)

(72) Inventors: Sandeep Chandrashekhara, Shrewsbury, MA (US); Michael Ferrari, Douglas, MA (US); George F. Lettery, North Grafton, MA (US); Nicholas W. Von Hein, Riverside, RI (US); Shruti Gupta, Hopkinton, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 289 days.

(21) Appl. No.: 15/969,048

(22) Filed: May 2, 2018

(65) Prior Publication Data

US 2019/0340292 A1    Nov. 7, 2019

(51) Int. Cl.
*G06F 7/00* (2006.01)
*G06F 16/27* (2019.01)
*G06F 12/0875* (2016.01)
*G06F 16/11* (2019.01)

(52) U.S. Cl.
CPC ........ *G06F 16/273* (2019.01); *G06F 12/0875* (2013.01); *G06F 16/128* (2019.01); *G06F 2212/604* (2013.01)

(58) Field of Classification Search
CPC .. G06F 16/273; G06F 16/128; G06F 12/0875; G06F 2212/604; G06F 16/172; G06F 12/0868; G06F 12/10; G06F 2212/152; G06F 2212/154; G06F 2212/313; G06F 2212/1041; G06F 3/0619; G06F 3/0673; G06F 3/0689; G06F 3/067; G06F 11/1456; G06F 11/1464; G06F 11/1484; G06F 11/1486

See application file for complete search history.

(56) References Cited

U.S. PATENT DOCUMENTS

| | | | |
|---|---|---|---|
| 5,206,939 A | 4/1993 | Yanai et al. | |
| 5,778,394 A | 7/1998 | Galtzur et al. | |
| 5,845,147 A | 12/1998 | Vishlitzky et al. | |
| 5,857,208 A | 1/1999 | Ofek | |
| 7,340,489 B2 | 3/2008 | Vishlitzky et al. | |
| 7,779,291 B2 | 8/2010 | Yoder et al. | |
| 8,321,642 B1 * | 11/2012 | Anzai | G06F 11/1448 711/161 |
| 9,965,216 B1 | 5/2018 | Jaganathan et al. | |
| 2018/0217756 A1 * | 8/2018 | Liu | G06F 3/0689 |

\* cited by examiner

*Primary Examiner* — Azam M Cheema
(74) *Attorney, Agent, or Firm* — Muirhead and Saturnelli, LLC

(57) ABSTRACT

Techniques for providing snapshots of logical devices may include: receiving a first request to create a first snapshot of a logical device; responsive to the first request, performing first processing including storing first information in a cache slot, the first information identifying the first snapshot and the logical device used as a source of the first snapshot; receiving a second request to activate one or more snapshots, including the first snapshot, identified by information stored in the cache slot; and responsive to receiving the second request, performing second processing including initiating execution of an asynchronous process that performs snapshot activation processing for the one or more snapshots identified by the cache slot.

18 Claims, 22 Drawing Sheets

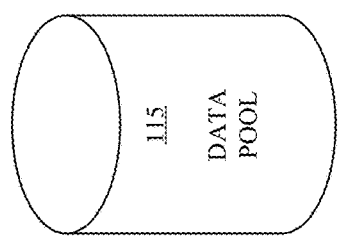
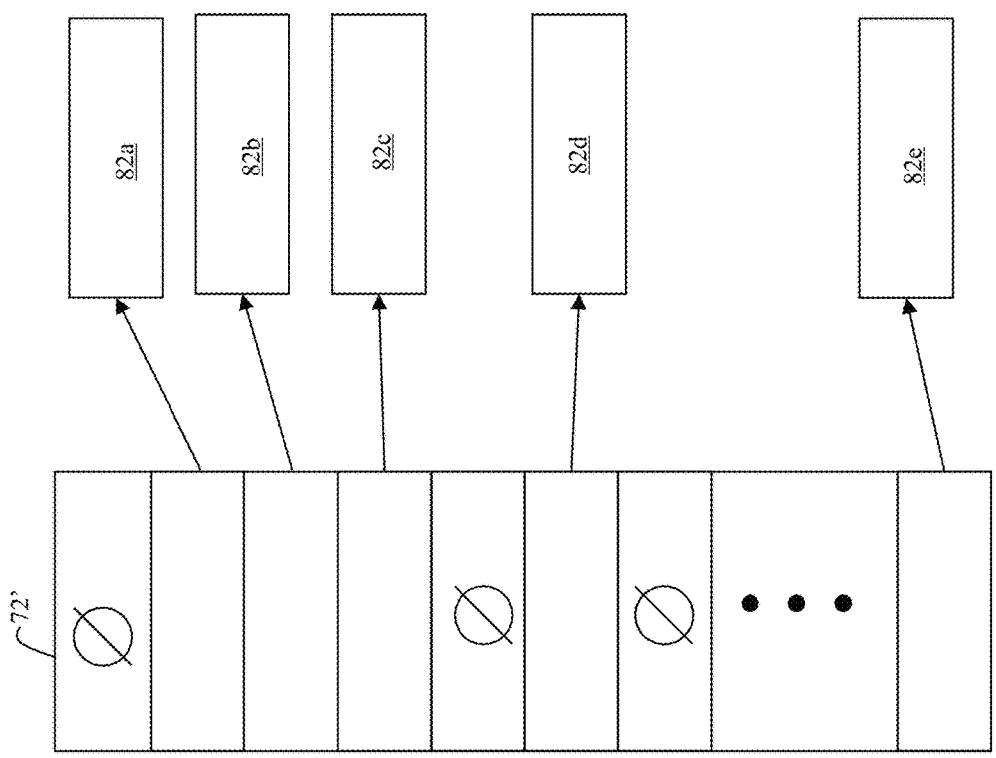

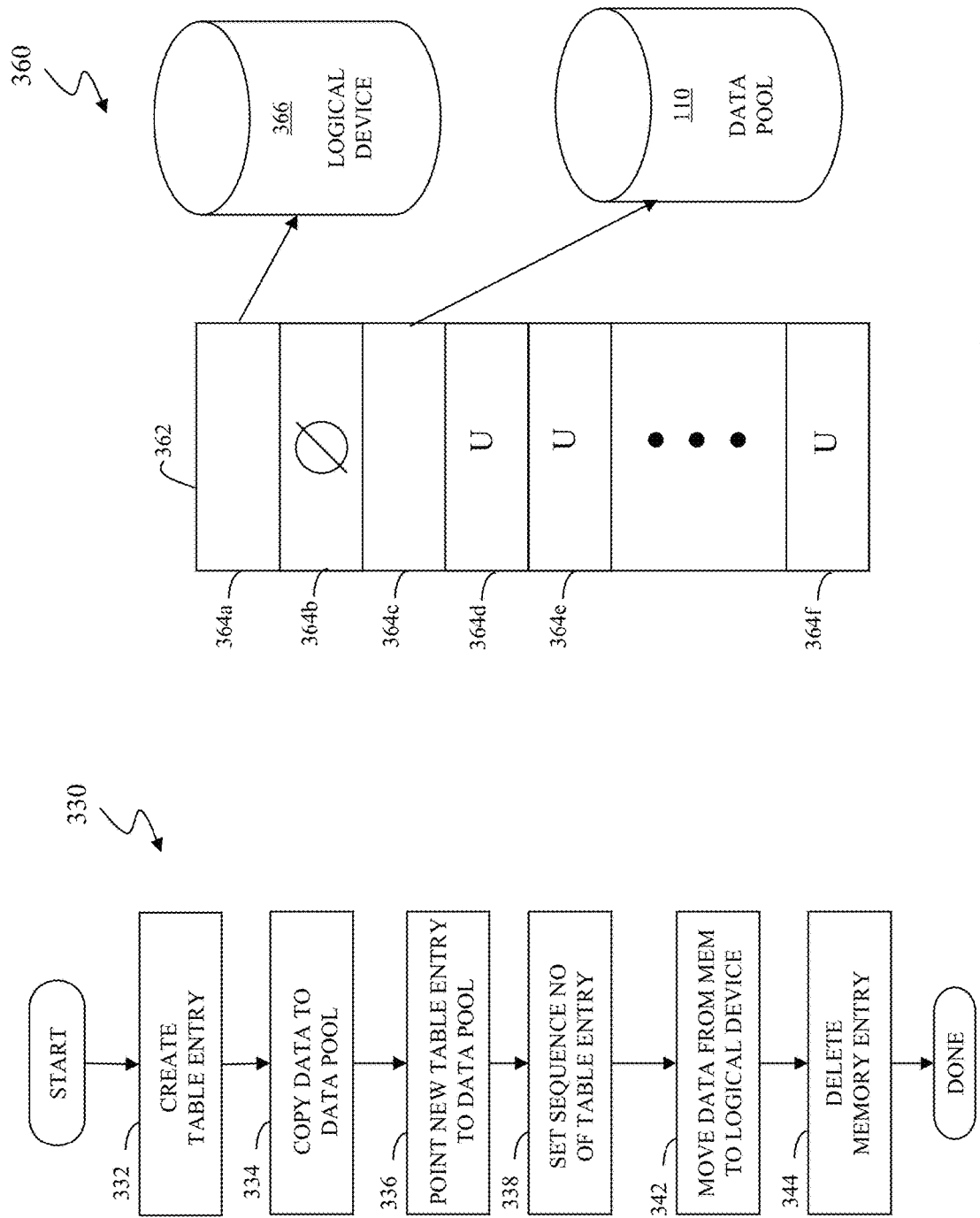

EFFICIENT SNAPSHOT ACTIVATION

BACKGROUND OF THE INVENTION

1. Technical Field

This application relates to data storage, and more particularly to snapshots.

2. Description of Related Art

Data storage systems may include resources used by one or more host systems. Data storage systems and host systems may be interconnected by one or more communication connections such as in a network. These resources may include, for example, data storage devices such as those included in the data storage systems manufactured by Dell Inc. These data storage systems may be coupled to one or more host systems where the data storage systems provide storage services to each host system. Multiple data storage systems from one or more different vendors may be connected and may provide data storage services for one or more host systems.

A host may perform a variety of data processing tasks and operations. For example, a host may perform I/O operations such as data read and write operations sent to the data storage system. Host systems may store data to and/or retrieve data from a storage device included in a data storage system containing a plurality of host interface units, physical storage devices or drives, and physical storage interface units. The storage device may be a logical storage device. The host systems access the storage device through a plurality of channels provided therewith. Host systems may perform read and write operations through the channels to the data storage system and the data storage system provides data to the host systems also through the channels. The host systems do not address the physical storage devices or drives of the data storage system directly, but rather, access what appears to the host systems as a plurality of logical storage devices or units (which may or may not correspond to the actual physical storage devices or drives). Allowing multiple host systems to access a single storage device allows the host systems to share data of the storage device. In order to facilitate sharing of the data on the storage device, additional software on the data storage systems may also be used.

SUMMARY OF THE INVENTION

In accordance with aspects of techniques herein are a method, system and computer readable medium for providing snapshots of logical devices comprising: receiving a first request to create a first snapshot of a logical device; responsive to the first request, performing first processing including storing first information in a cache slot, the first information identifying the first snapshot and the logical device used as a source of the first snapshot; receiving a second request to activate one or more snapshots, including the first snapshot, identified by information stored in the cache slot; and responsive to receiving the second request, performing second processing including initiating execution of an asynchronous process that performs snapshot activation processing for the one or more snapshots identified by the cache slot. While performing said second processing, no writes may be allowed to any logical device identified in the cache slot as a source logical device of one of the one or more snapshots. The second processing may include setting an activation indicator for the cache slot indicating that a request has been received to activate the one or more snapshots identified in the cache slot. The first processing may include: obtaining the cache slot; performing create processing for the first snapshot; setting a pending activate indicator associated with the first snapshot and the first logical device; performing said storing first information in the cache slot; and returning a handle to the cache slot. Prior to receiving the second request, a third request may be received to create a second snapshot of a second logical device, the third request identifying the handle to the cache slot; and responsive to the third request, third processing may be performed. The third processing may include: performing create processing for the second snapshot; setting a pending activate indicator associated with the second snapshot and the second logical device; and storing second information in the cache slot, the second information identifying the second snapshot and the second logical device used as a source of the second snapshot. The asynchronous process that performs snapshot activation processing for the one or more snapshots identified by the cache slot may traverse a list identifying the one more snapshots and may perform activation processing for each of the one or more snapshots having its associated pending activate indicator set thereby denoting that activation processing has not been completed for said each snapshot. A first write may be received that writes first data to a first location of the logical device, wherein the first write may be received after completing the first processing and the second processing. It may be determined whether the pending activate indicator associated with the logical device is set and whether the activate indicator, of the cache slot identifying the logical device and the first snapshot, is set. Responsive to determining that the pending activate indicator associated with the logical device is set and that the activate indicator, of the cache slot identifying the logical device and the first snapshot, is set, other processing may be performed. The other processing may include snapshot activation processing that activates the first snapshot. The other processing may include clearing the pending activate indicator associated with the logical device and the first snapshot; and performing additional write processing with respect to the first write. The additional write processing may include determining whether to save existing data stored at the first location of the logical device prior to writing the first data to the first location; responsive to determining to save existing data stored at the first location of the logical device, storing the existing data in a replication data pointers structure along with existing sequence number identifying a particular version of data stored at the first location; and writing the first data to the first location once the existing data has been stored in the replication data pointer structure associated with the first location of the logical device. The create processing for the first snapshot may include reserving a first entry for the first snapshot in a snapshot table for the first device; and storing a first snapshot identifier in the first entry said first identifier identifying the first snapshot. A device sequence number may be maintained for the logical device. The device sequence number may be incremented for each new snapshot activated for the logical device. The snapshot activation processing that activates the first snapshot may include incrementing the device sequence number associated with the first device; and storing the incremented device sequence number for the first device as a sequence number in the first entry to denote a value of the device sequence number at a time when the first snapshot is activated.

BRIEF DESCRIPTION OF DRAWINGS

Embodiments of the system described herein are explained with reference to the several figures of the drawings, which are briefly described as follows.

FIG. 4 is a diagram showing a table used for a thin logical device in connection with the system described herein.

FIG. 6 is a diagram showing a data pool used in connection with the system described herein.

FIG. 7 is a diagram showing a snapshot table used in connection with the system described herein.

FIG. 14 is a flow diagram illustrating processing performed in connection with moving data from memory to a logical device according to the system described herein.

FIG. 15 is a diagram showing linking a logical volume to a targetless snapshot in connection with the system described herein.

DETAILED DESCRIPTION OF VARIOUS EMBODIMENTS

Figure 1:
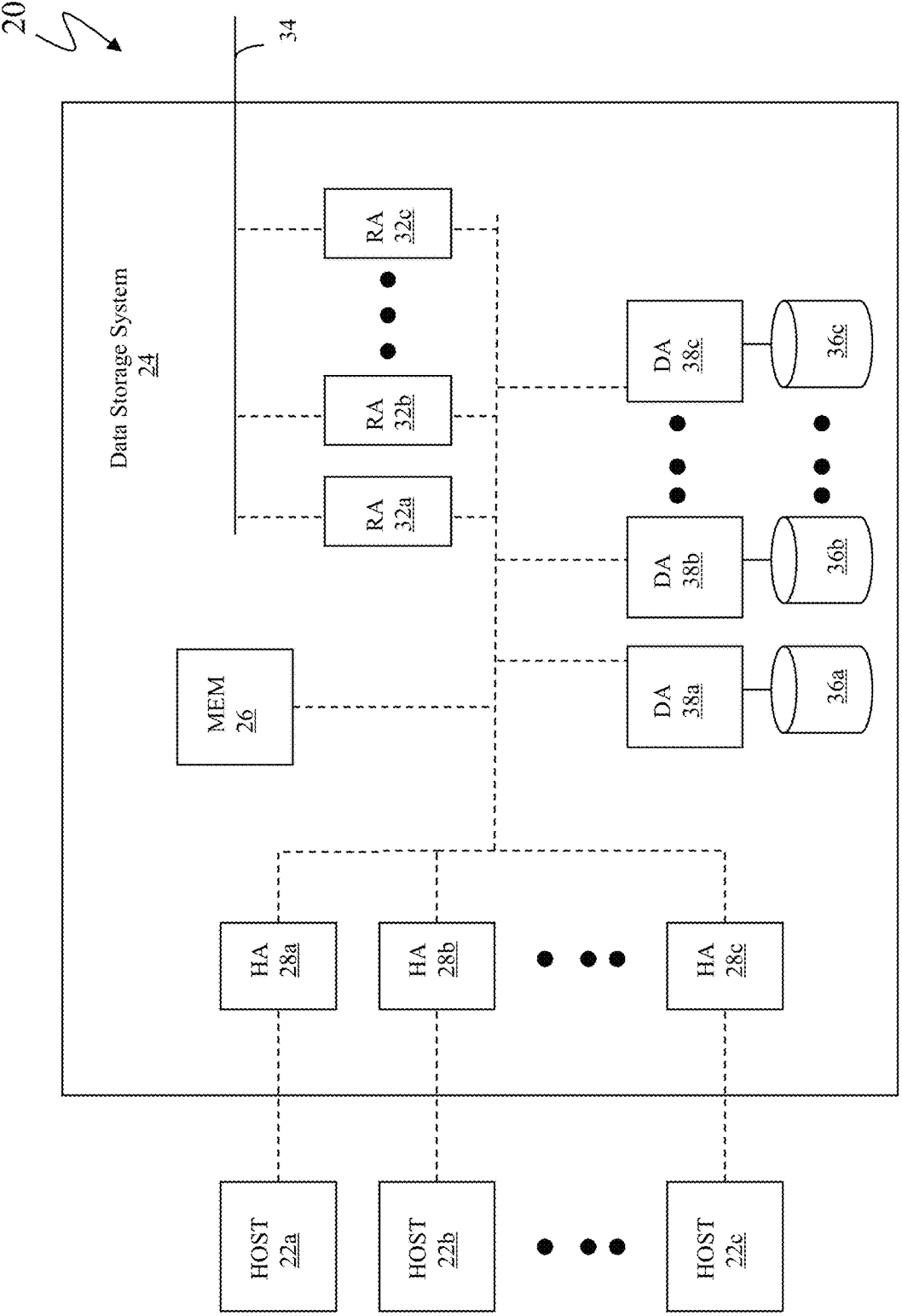
FIG. 1 is a diagram showing a plurality of hosts and a data storage system used in connection with the system described herein.

Referring to FIG. 1, a diagram 20 shows a plurality of hosts 22a-22c coupled to a data storage system 24, such as data storage array, that may be used in connection with an embodiment of the system described herein. Each of the hosts 22a-22c may all be located at the same physical site or may be located in different physical sites and may be coupled to the data storage system 24 using SCSI, Fibre Channel, iSCSI, etc. The data storage system 24 includes a memory 26 that facilitates operation of the storage system 24, as further described elsewhere herein. The data storage system 24 also includes a plurality of host adapters (HA's) 28a-28c that handle reading and writing of data between the hosts 22a-22c and the storage system 24. Although the diagram 20 shows each of the hosts 22a-22c coupled to each of the HA's 28a-28c, it will be appreciated by one of ordinary skill in the art that one or more of the HA's 28a-28c may be coupled to other hosts.

In an embodiment, the storage system 24 may include one or more Remote Data Facility (RDF) adapter units (RA's) 32a-32c. An RDF product produced by Dell Inc may be used to copy data from one storage system to another. For example, if a host writes data to a first storage system (e.g., a local storage system), it may be desirable to copy that data to a second storage system provided in a different location (e.g., a remote storage system). The RA's 32a-32c are coupled to an RDF link 40 and are similar to the HA's 28a-28c, but are used to transfer data between the storage system 24 and other storage systems that are also coupled to the RDF link 40. The storage system 24 may be coupled to additional RDF links (not shown) in addition to the RDF link 40. For further discussion of example RDF systems and the use thereof in data storage and recovery techniques, see, for example, U.S. Pat. No. 7,779,291 to Yoder et al., entitled "Four Site Triangular Asynchronous Replication," which is incorporated herein by reference.

The storage system 24 may also include one or more PDs (non-volatile physical storage devices) 36a-36c, each containing a different portion of data stored on the storage system 24. Each of the PDs 36a-36c may be coupled to a corresponding one of a plurality of disk adapter units (DA) 38a-38c that provides data to a corresponding one of the PDs 36a-36c and receives data from a corresponding one of the PDs 36a-36c. The PDs 36a-36c may include any appropriate storage medium or mechanism, including hard disks (e.g., rotating disk drives), solid-state storage (flash memory), etc. Note that, in some embodiments, it is possible for more than one PD to be serviced by a DA and that it is possible for more than one DA to service a single PD. It is noted that the term "data" as used herein may be appropriately understood, in various embodiments, to refer to data files, extents, blocks, chunks and/or other designations that indicate a unit, segment or collection of data.

The logical storage space in the storage system 24 that corresponds to the PDs 36a-36c may be subdivided into a plurality of volumes or logical devices. The logical storage space may also be merged in connection with use of a plurality of volumes or logical devices. The logical devices may or may not correspond to the physical storage space of the PDs 36a-36c. Thus, for example, the PD 36a may contain a plurality of logical devices or, alternatively, a single logical device could span both of the PDs 36a, 36b. The hosts 22a-22c may be configured to access any combination of logical devices independent of the location of the logical devices on the PDs 36a-36c. A device, such as a logical device described above, has a size or capacity that may be expressed in terms of device geometry. The device geometry may include device geometry parameters regarding the number of cylinders in the device, the number of heads or tracks per cylinder, and the number of blocks per track, and these parameters may be used to identify locations on a PD. Other embodiments may use different structures.

One or more internal logical data path(s) exist between the DA's 38a-38c, the HA's 28a-28c, the RA's 32a-32c, and the memory 26. In some embodiments, one or more internal buses and/or communication modules may be used. In some embodiments, the memory 26 may be used to facilitate data transferred between the DA's 38a-38c, the HA's 28a-28c and the RA's 32a-32c. The memory 26 may contain tasks that are to be performed by one or more of the DA's 38a-38c, the HA's 28a-28c and the RA's 32a-32c and a cache for data fetched from one or more of the PDs 36a-36c. Use of the memory 26 is further described elsewhere herein in more detail. The storage system 24 may be provided as a stand-alone device coupled to the hosts 22a-22c as shown in FIG. 1 or, alternatively, the storage system 24 may be part of, and/or otherwise coupled to, a storage area network (SAN) that may include a plurality of other storage systems as well as switches, routers, network connections, etc., as further discussed elsewhere herein.

Figure 2:
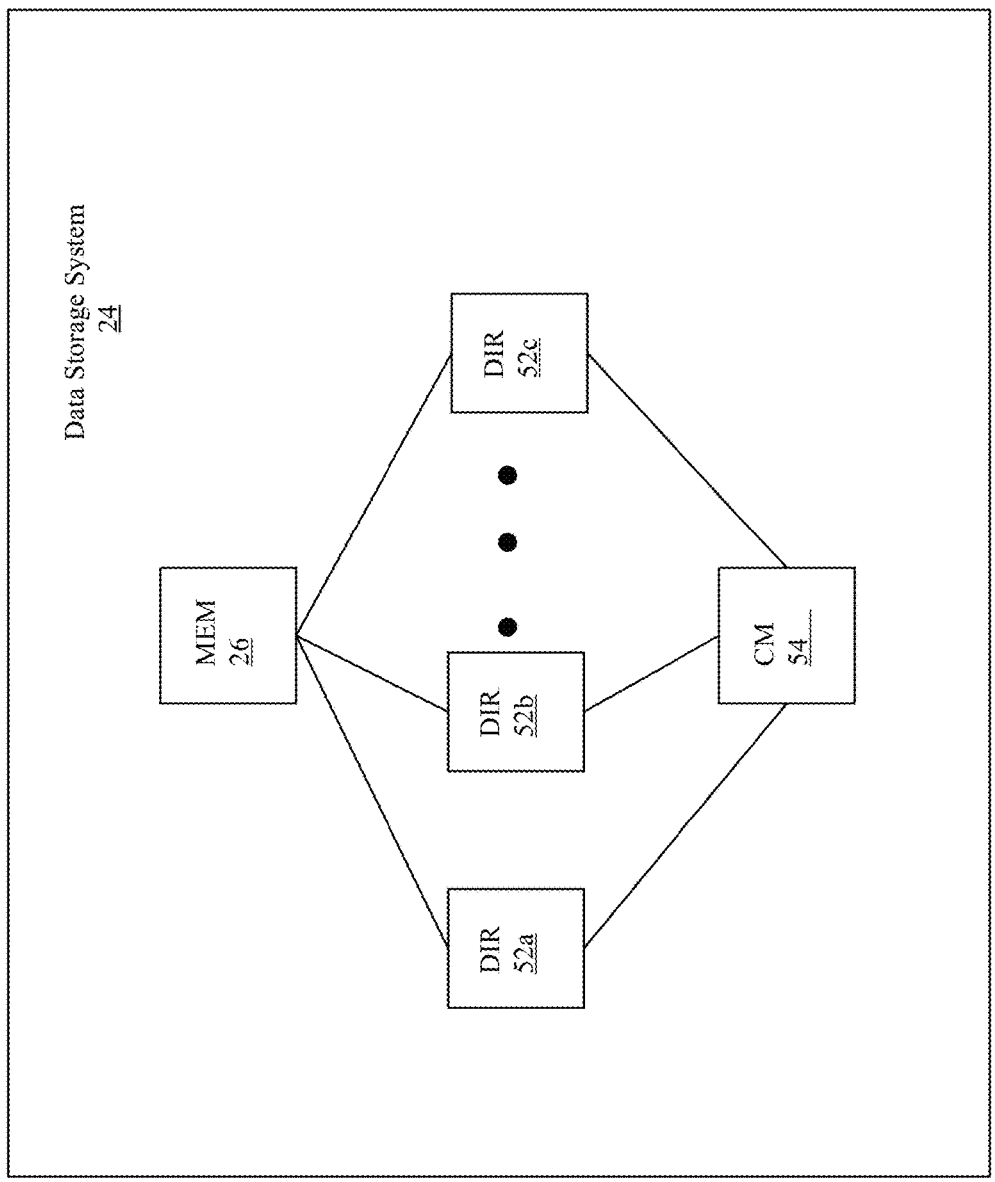
FIG. 2 is a diagram showing a data storage system, memory, a plurality of directors, and a communication module according to the system described herein.

FIG. 2 is a schematic diagram 50 illustrating an embodiment of the storage system 24 where each of a plurality of directors 52a-52c are coupled to the memory 26. Each of the directors 52a-52c may represent one of the HA's 28a-28c, RA's 32a-32c, and/or DA's 38a-38c. The diagram 50 also shows an optional communication module (CM) 54 that provides an alternative communication path between the directors 52a-52c. Each of the directors 52a-52c may be coupled to the CM 54 so that any one of the directors 52a-52c may send a message and/or data to any other one of the directors 52a-52c without needing to go through the memory 26. The CM 54 may be implemented using conventional MUX/router technology where a sending one of the directors 52a-52c provides an appropriate address to cause a message and/or data to be received by an intended receiving one of the directors 52a-52c. Some or all of the functionality of the CM 54 may be implemented using one or more of the directors 52a-52c so that, for example, the directors 52a-52c may be interconnected directly with the interconnection functionality being provided on each of the directors 52a-52c. In addition, a sending one of the directors 52a-52c may be able to broadcast a message to all of the other directors 52a-52c at the same time.

In some embodiments, one or more of the directors 52a-52c may have multiple processor systems thereon and thus may be able to perform functions for multiple directors. In some instances, at least one of the directors 52a-52c having multiple processor systems thereon may simultaneously perform the functions of at least two different types of directors (e.g., an HA and a DA). Furthermore, in some embodiments, at least one of the directors 52a-52c having multiple processor systems thereon may simultaneously perform the functions of at least one type of director and perform other processing with the other processing system. In addition, the memory 26 may be a global memory in which all or at least part of the global memory may be provided on one or more of the directors 52a-52c and shared with other ones of the directors 52a-52c. The memory 26 may be part of a global memory distributed across the processor systems of more than one storage system and accessible by each of the storage systems.

It should be noted that although examples of techniques herein may be made with respect to a physical data storage system and its physical components (e.g., physical hardware for each HA, DA, HA port and the like), techniques herein may be performed in a physical data storage system including one or more emulated or virtualized components (e.g., emulated or virtualized ports, emulated or virtualized DAs or HAs), and also a virtualized or emulated data storage system including virtualized or emulated components.

Note that, although specific data storage system configurations are disclosed in connection with FIGS. 1 and 2, it should be understood that the system described herein may be implemented on any appropriate platform. Thus, the system described herein may be implemented using a platform like that described in connection with FIGS. 1 and 2 or may be implemented using a platform that is somewhat or even completely different from any particular platform described herein.

Figure 3:
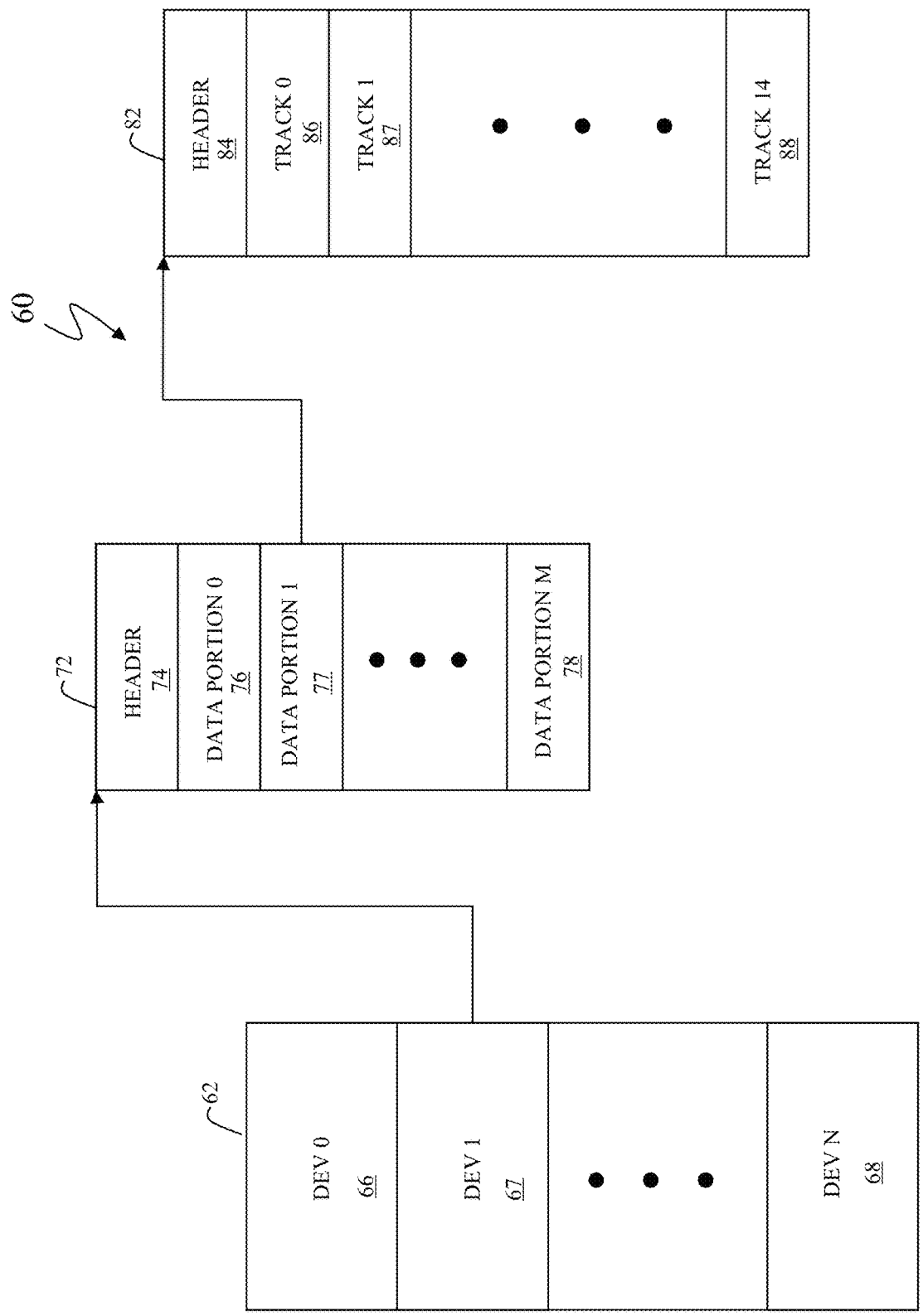
FIG. 3 is a diagram showing device tables used in connection with the system described herein.

Referring to FIG. 3, a diagram 60 illustrates tables that are used to keep track of logical device information. A first table 62 corresponds to all of the logical devices used by the storage system 24 or by an element of a storage system, such as an HA and/or a DA. The table 62 includes a plurality of logical device entries 66-68 that correspond to the logical devices used by the data storage system 24. The entries in the table 62 include descriptions for standard logical devices, virtual devices, log devices, thin devices, and other types of logical devices.

Each of the entries 66-68 of the table 62 corresponds to another table that contains information for each of the logical devices. For example, the entry 67 may correspond to a table 72. The table 72 includes a header that contains overhead information. The table 72 also includes entries 76-78 for separate contiguous data portions of the logical device (e.g., a cylinder and/or a group of tracks). In an embodiment disclosed herein, a logical device may contain any number of data portions depending upon how the logical device is initialized. However, in other embodiments, a logical device may contain a fixed number of data portions.

Each of the data portion entries 76-78 corresponds to a track table. For example, the entry 77 may correspond to a track table 82 that includes a header 84 having overhead information. The track table 82 also includes entries 86-88 for each of the tracks. In an embodiment disclosed herein, there are fifteen tracks for every contiguous data portion. However, for other embodiments, it may be possible to have different numbers of tracks for each of the data portions or even a variable number of tracks for each data portion. For standard logical devices, the information in each of the entries 86-88 includes a pointer (either direct or indirect) to a physical address on one of the PDs 36a-36c of the storage system 24 (or a remote storage system if the system is so configured). Thus, the track table 82 may be used to map logical addresses of the logical device corresponding to the tables 62, 72, 82 to physical addresses on the PDs 36a-36c of the storage system e 24.

The tables 62, 72, 82 of FIG. 3 may be stored in the global memory 26 of the storage system 24 during operation thereof and may otherwise be stored in non-volatile memory (i.e., with the corresponding physical device). In addition, tables corresponding to logical devices accessed by a particular host may be stored in local memory of the corresponding one of the HA's 28a-28c. In addition, the RA's 32a-32c and/or the DA's 38a-38c may also use and locally store portions of the tables 62, 72, 82.

Referring to FIG. 4, a table 72' for a thin logical device is shown as including null pointers as well as entries similar to entries for the table 72, discussed above, that point to a plurality of track tables 82a-82e. The thin logical device is allocated by the system to show a particular storage capacity while having a smaller amount of physical storage that is actually allocated. When a thin logical device is initialized, all (or at least most) of the entries in the table 72' are set to null. Physical data may be allocated for particular sections as data is written to the particular data portion. If no data is written to a data portion, the corresponding entry in the table 72' for the data portion maintains the null pointer that was written at initialization.

Figure 5A:
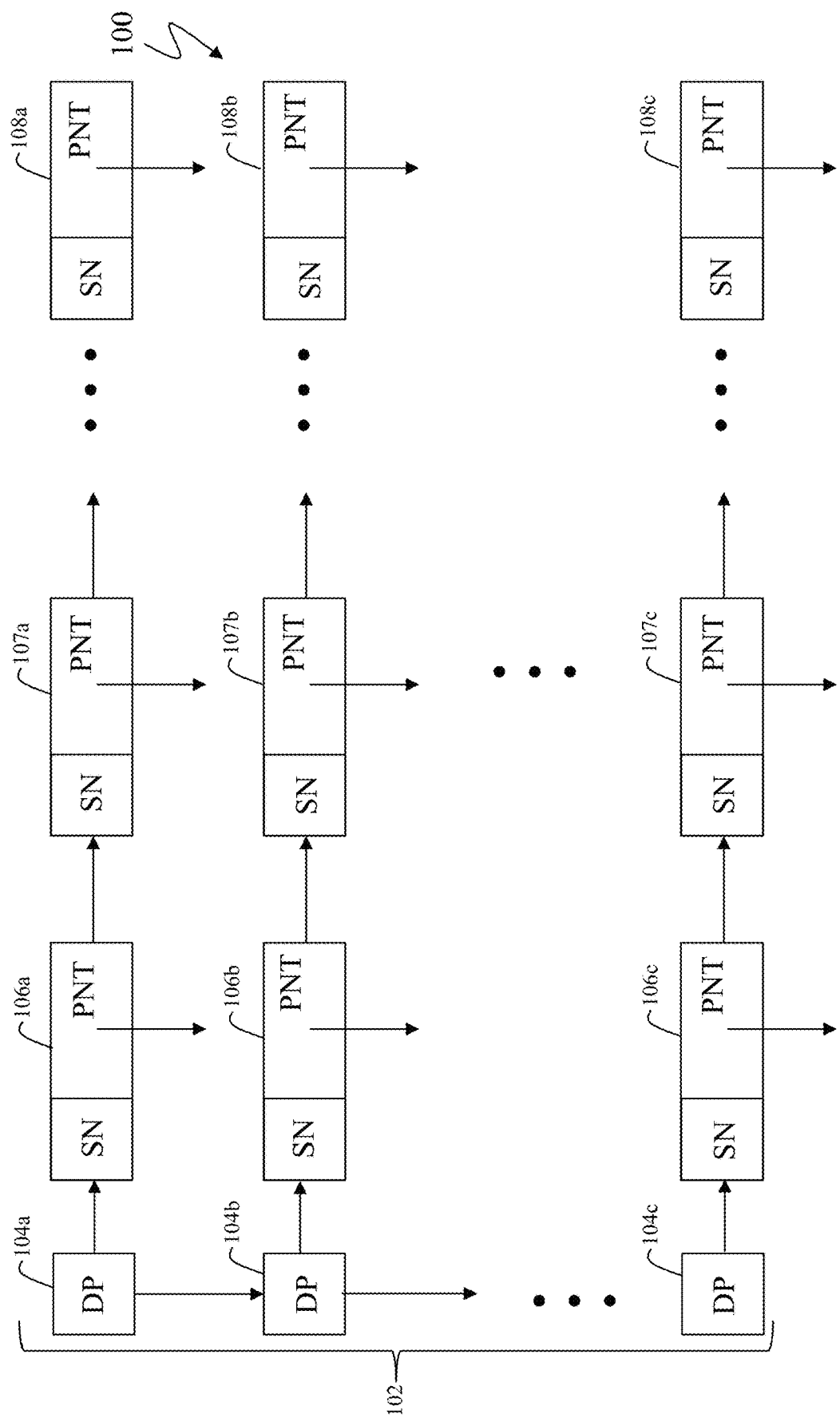
FIG. 5A is a diagram showing a replication data pointer table that may be used in connection with the system described herein.

Referring to FIG. 5A, a replication data pointers table 100 includes a first linked list 102 of a plurality of data portion numbers 104a-104c. The replication data pointers table 100 is used to maintain data that is moved in connection with providing targetless snapshots, as described herein. Each of the data portion numbers 104a-104c corresponds to a contiguous data portion of a logical device. The logical device may be a conventional logical device with all of the data portions having corresponding physical data storage allocated thereto or may be a thin logical device, described above.

Each of the data portion numbers 104a-104c corresponds to one or more table entries that are maintained using an appropriate data structure, such as a linked list. The data portion number 104a corresponds to a plurality of table entries 106a-108a, the data portion number 104b corresponds to a plurality of table entries 106b-108b, and the data portion number 104c corresponds to a plurality of table entries 106c-108c. Note that, although the table 100 is illustrated with three data portion numbers 104a-104c each having three table entries, the table 100 can contain any number of data portion numbers each having any number of table entries. In some cases, which will become apparent from the additional discussion herein, it is possible for there to be no data portion number or corresponding table entries associated with a particular data portion of a logical device. Each of the table entries 106a-108c includes a sequence number and a pointer to storage, which are explained in more detail elsewhere herein.

Figure 5B:
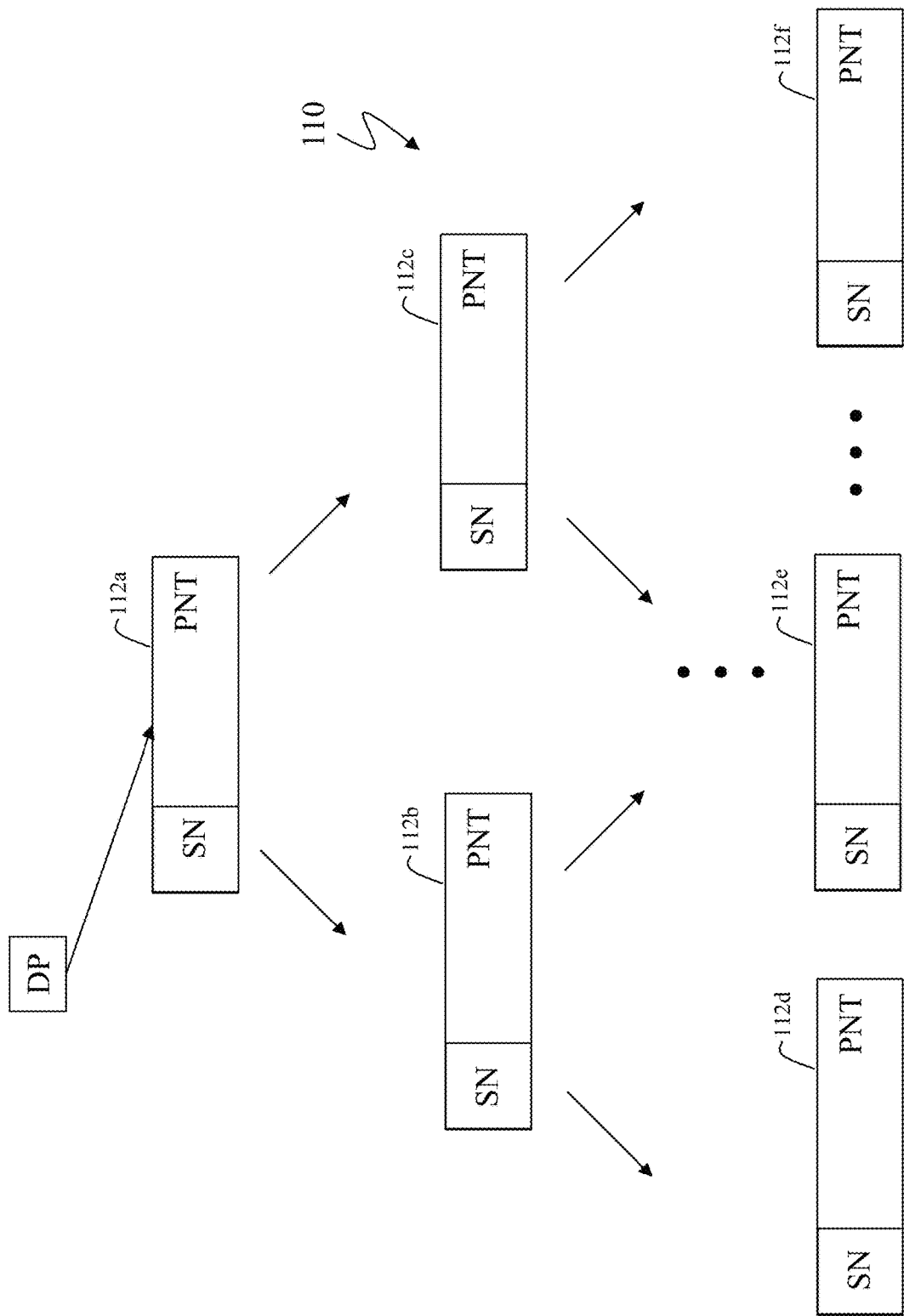
FIG. 5B is a diagram showing a replication data pointer tree that may be used in connection with the system described herein.

Referring to FIG. 5B, a replication data pointers tree 110 includes a plurality of table entries 112a-112f that each correspond to a particular data portion. Each of the table entries 112a-112f includes a sequence number and a pointer to storage. The replication data pointers tree 110 corresponds to one of the linked lists pointed to by one of the data pointers 104a-104c of the replications data pointers table 100, discussed above. The sequence number and the pointer to storage are similar to the sequence number and pointer to storage used in connection with the table 100, and are described in more detail elsewhere herein. In an embodiment herein, the tree 110 is a balanced binary tree ordered according to sequence number.

Referring to FIG. 6, a data pool 115 includes storage for data that is moved in connection with maintaining targetless snapshots. Data stored in the data pool 115 is pointed to by the pointers provided with the table entries 106a-108c or the table entries 112a-112f. In some embodiments, the data pool 115 is provided in a single logical and/or physical location. In other embodiments, the data pool 115 may be distributed and/or may use more than one physical and/or logical data storage element. Providing data to the data pool 115 is discussed in more detail elsewhere herein.

Referring to FIG. 7, a snapshot table 120 includes a plurality of entries corresponding to particular snapshots. Each of the entries includes a snapshot ID and a sequence number. The snapshot ID may be used to identify a particular snapshot and could be text (e.g., "Mar. 12, 2014, 8:00 am snapshot") or could be a token that is used by other software (not shown herein) to identify each of the snapshots. The sequence number provided with each of the snapshots is used in connection with providing targetless snapshots and is described in more detail elsewhere herein.

Figures 8, 9:
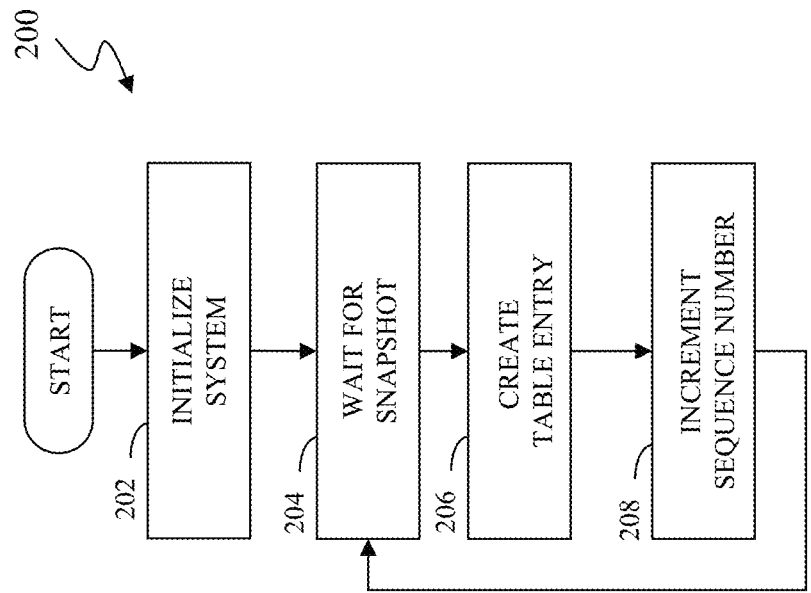
FIG. 8 is a diagram showing a sequence number pointer table used in connection with the system described herein.
FIG. 9 is a flow diagram illustrating processing performed in connection with initiating a targetless snapshot according to the system described herein.

Referring to FIG. 8, a sequence number table 130 is shown as having a plurality of entries. Each of the entries of the table 130 contains a sequence number, described in more detail elsewhere herein. The table 130 can contain a single entry for each data portion number (or other appropriate data increment) of the logical device (e.g., thin logical device) for which targetless snapshots are being provided. Thus, for example, if there are one hundred data portions in a logical device, there are one hundred entries for sequence numbers in the table 130. Use of the sequence number table 130 and of sequence numbers is described in more detail elsewhere herein.

Referring to FIG. 9, a flow diagram 200 illustrates operations performed in connection with performing targetless snapshots for a logical device. Processing begins at a first step 202 where a global sequence number (associated with the logical device for which targetless snapshots are being provided) and the tables 100, 120, 130 that are used with targetless snapshots are initialized. Note that the tree 110 may be used in addition to or instead of the table 100. In an embodiment herein, snapshot sequence numbers start at zero and are incremented by one for each snapshot, but of course in other instances it is possible to start at any number and increment or decrement by any amount. At the step 202, the replication pointers table data pointers table 100 (and/or the tree 110) is initialized to be empty (contain no entries), the snapshot table 120 is initialized to be empty, the sequence number table 130 is initialized so that each entry contains zero (the initial sequence number), and the global sequence number is initialized to zero (the initial sequence number).

Following the step 202 is a step 204 where the system waits for a snapshot to occur. A snapshot may be user initiated or may be automated to occur at specific times (e.g., every hour). Once a snapshot occurs, control transfers from the step 204 to a step 206 where an entry corresponding to the snapshot is created in the snapshot table 120. At the step 206, the ID value is provided to the new entry in the snapshot table 120 and the corresponding sequence number is set to one greater than the current global sequence number. The ID value may include a user specified name that is to be associated with the sequence number provided to the entry. Following the step 206 is a step 208 where the global sequence number is incremented. Following the step 208, control transfers back to the step 204 to wait for the next snapshot to occur.

Figures 10, 11:
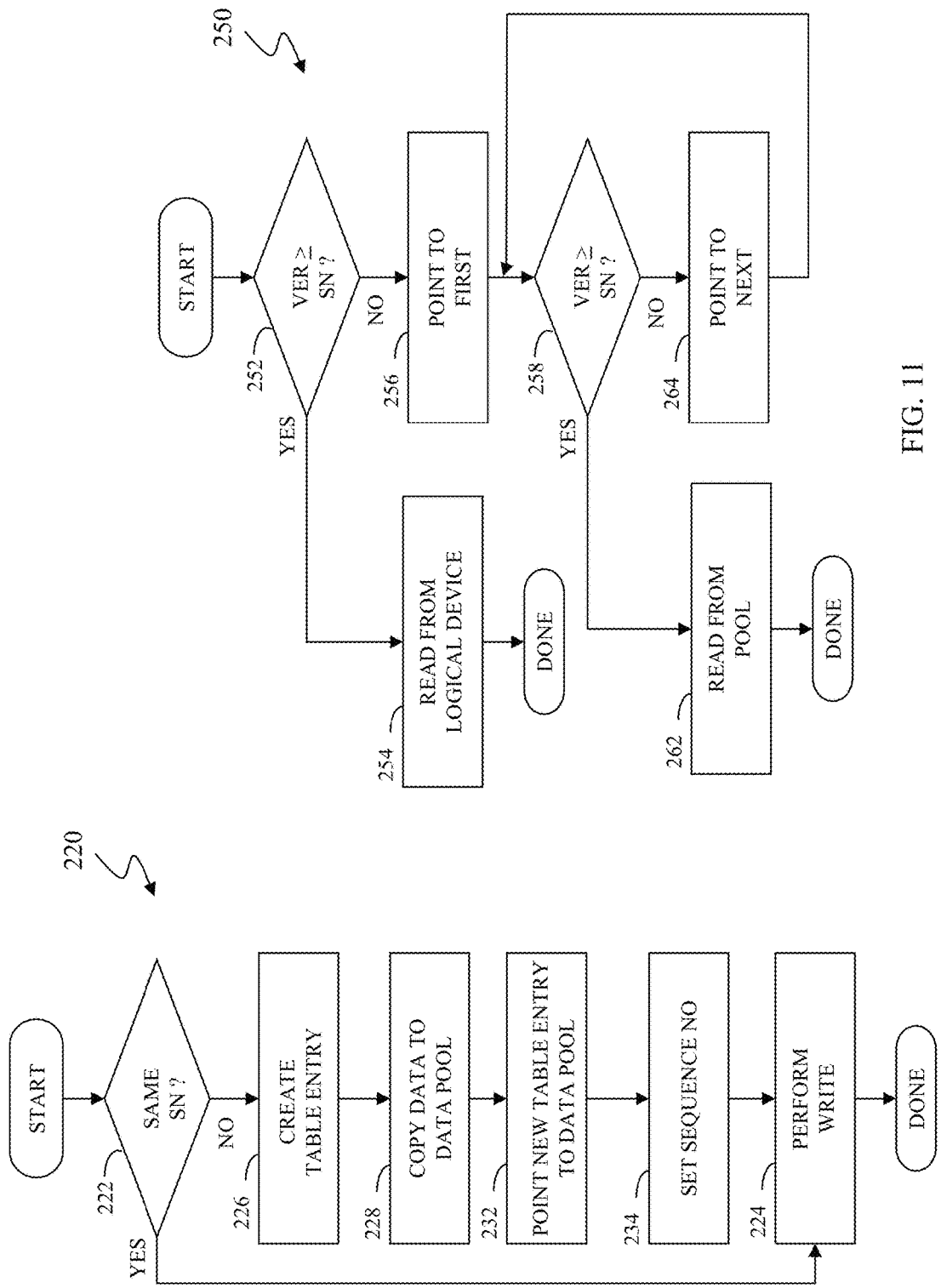
FIG. 10 is a flow diagram illustrating processing performed in connection with a write to a logical device after initiating a targetless snapshot according to the system described herein.
FIG. 11 is a flow diagram illustrating processing performed in connection with a read operation after initiating a targetless snapshot according to the system described herein.

Referring to FIG. 10, a flow diagram 220 illustrates steps performed in connection with a write operation to a logical device for which snapshots are being provided. Processing begins at a first test step 222 where it is determined if the global sequence number equals the sequence number associated with the data portion to which the write is being provided, which is provided by the sequence number table 130. If so, then control transfers from the test step 222 to a step 224 where the write operation is performed in a usual fashion. No special processing is performed in this case because the global sequence number being equal to the sequence number where the data is being written means that any snapshot data associated with that particular data section has already been protected (copied to the data pool 115, as described in more detail elsewhere herein). Following the step 224, processing is complete.

If it is determined at the step 222 that the global sequence number does not equal the sequence number associated with the data portion to which the write is being performed (the global sequence number is greater), then control transfers from the step 222 to a step 226 where an entry in the replication data pointers table 100 is created by placing the new entry in a linked list using the data portion number where the write is being performed on the logical device and using the sequence number for the source data portion (from the sequence number table 130). If the replication data pointers tree 110 is used, then at the step 226 a new entry is created for the tree 110. Following the step 226 is a step 228 where data that is being overwritten is copied from the logical device to the data pool 115. Note that the step 228 may be omitted in instances where the logical device is a thin device and the particular data portion is empty (e.g., the pointer for the data portion points to null). Note also that, in some cases data on the logical device may be cached, in which case the copy may be from the cache memory.

Following the step 228 is a step 232 where the pointer in the table entry created at the step 226, described above, is set to point to the data in the data pool 115 that was copied at the step 228, described above, or to null in the case of a thin logical device with no data in the data portion. Following the step 232 is a step 234 where the sequence number for the entry in the sequence number table 130 is set to the global sequence number, indicating that the corresponding data written to the logical device corresponds to the current global sequence number. Following the step 234 is the step 224, discussed above, where the write operation to write the new data to the device is performed. Following the step 224, processing is complete.

Referring to FIG. 11, a flow diagram 250 illustrates processing performed in connection with reading different versions from different snapshots of data on the logical device. Processing begins at a first step 252 where it is determined if a sequence number associated with a desired version (VER in flow diagram 250) is greater than or equal to a version number from the sequence number table (SNT in the flow diagram 250). For example, if it was desired to read a version of data associated with a particular snapshot (e.g., "8:00 am on Mar. 12, 2014") having a sequence number X, then the test at the step 252 would compare X with an entry in the sequence number table for the data portion of interest containing data being read, which is provided in the sequence number table 130. If it is determined at the step 252 that the sequence number of the desired version is greater than or equal to a version number from the sequence number table corresponding to the data being read, then data on the logical device was written prior to the time of the snapshot and control transfers from the step 252 to the step 254 where the data is read from the logical device. Note that this also occurs when it is desired to read current data from the logical device since data on the logical volume is always the latest version. Following the step 254, processing is complete.

If it is determined at the step 252 that the sequence number of the desired version is not greater than or equal to a version number from the sequence number table corresponding to the data being read, then data on the logical device was written after the time of the snapshot and the desired data is in the data pool 115 and control transfers from the step 252 to a step 256 where an iteration pointer is set to point to a first item in a list of items in the replication data pointers table 100. The iteration pointer is used to traverse a list of pointers for a data portion corresponding to the data being read. For the explanation herein, it is assumed that the list of pointers is arranged with the most recently added table entry (having the highest sequence number) being first in the list, followed by the next most recently added table entry (having the second highest sequence number), etc. Generally, the iteration pointer iterates through table entries for a specific data portion from highest sequence number to lowest sequence number. Note that, in instances where the replication data pointers tree 110 is used, the iteration pointer is set to point to the top of the tree 110 and is used to traverse the tree 110.

Following the step 256 is a test step 258 where it is it is determined if a sequence number associated with the desired version is greater than or equal to a version number associated with the table or tree entry indicated by the iteration pointer, similar to the test at the step 252, discussed above. If so, then control transfers from the test step 258 to a step 262 where data is read from the data pool 115 according to the data pointer of the table or tree entry indicated by the iteration pointer. Following the step 262, processing is complete. Otherwise, if it is determined at the step 258 that the sequence number associated with the desired version is not greater than or equal to the version number associated with the table or tree entry indicated by the iteration pointer, then control transfers from the step 258 to a step 264 where the iteration pointer is set to point to a next table or tree entry. Note that the final item of the table or tree entries has a sequence number of zero so that, eventually, the test at the step 258 will cause the step 262 to be executed.

In some instances, it is possible to maintain written data in memory (e.g., in a cache database in the global memory 26). Version information may be maintained with the written data in memory to facilitate eventually moving the data to the logical device while providing targetless snapshots as described herein. The data may be moved using a background process.

Figures 12, 13:
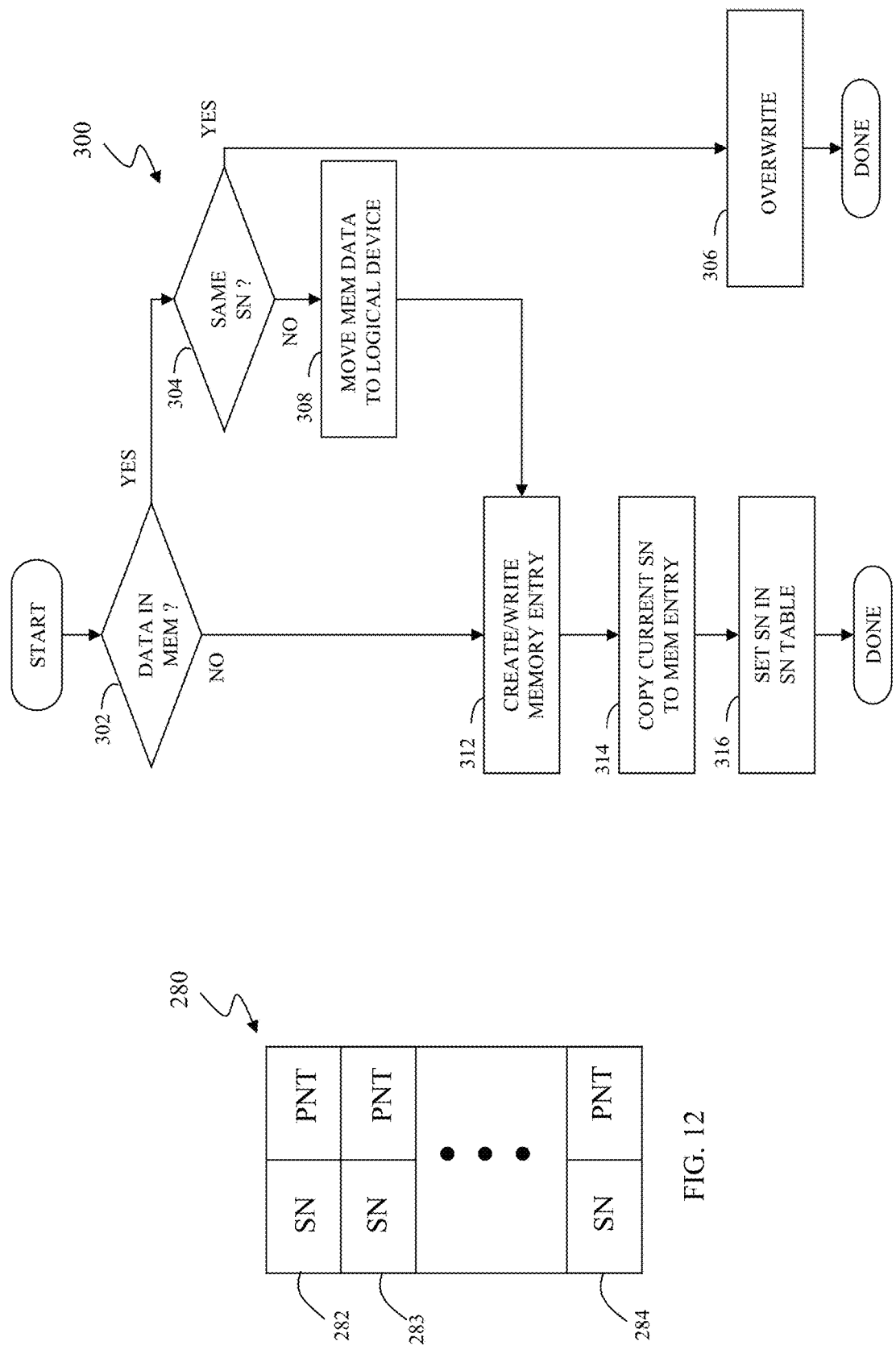
FIG. 12 is a diagram showing maintaining data writes in memory in connection with the system described herein.
FIG. 13 is a flow diagram illustrating processing performed in connection with maintaining data writes in memory according to the system described herein.

Referring to FIG. 12, a table 280 is shown as including a plurality of entries 282-284. Each of the entries 282-284 has a sequence number used for targetless snapshots and has corresponding data. The sequence number represents a value of the global sequence number at a time that the data is written. Data that is written to the logical device may be initially provided to the table 280, which may be stored in relatively fast volatile memory. Data from the table 280 may then be migrated to the logical device in a background operation. This is described in more detail elsewhere herein.

Referring to FIG. 13, a flow diagram 300 illustrates steps performed in connection with initially writing data to memory in a system using targetless snapshots. Processing begins at a first test step 302 where it is determined if other data corresponding to the particular data portion being written is already in memory from a previous write operation. If so, then control transfers from the test step 302 to a test step 304 where it is determined if the data currently in memory corresponds to data written during the current cycle (current value of the global sequence number associated with the logical device). If so, then control transfers from the step 304 to a step 306 where the data being written overwrites the data in memory. Following the step 306, processing is complete.

If it is determined at the step 304 that the data currently in memory does not correspond to data written during the current cycle, then control transfers from the test step 304 to a step 308 where the data currently in memory is moved to the logical device. Processing at the step 308 is discussed in more detail elsewhere herein. Following the step 308 is a step 312 where an entry for the data currently being written is created in the memory and the data being written is copied to the just-created memory entry. Note that the step 312 is also reached from the step 302 if it is determined at the step 302 that there is no data in memory corresponding to the portion being written. Following the step 312 is a step 314 where the sequence number for the data portion (from the sequence number table 130) is copied to the new memory entry. Following the step 314 is a step 316 where the sequence number in the sequence number table is set to the current value of the global sequence number. Following the step 316, processing is complete.

Referring to FIG. 14, a flow diagram 330 illustrates in more processing performed in connection with the step 308 of the flow diagram 300, described above. The processing illustrated by the flow diagram 330 may also be provided in connection with a background process for moving data from memory to the logical device, discussed elsewhere herein. Processing begins at a first step 332 where an entry is created in the replication data pointers table 100 or the replication data pointers tree 110 (whichever is used). The entry is similar to other entries in the table 100 or tree 110, discussed elsewhere herein. Following the step 332 is a step 334 where data from the logical device is copied to the data pool 115. Following the step 334 is a step 336 where the pointer in the new table or tree entry (created at the step 332) is set to point to the data copied to the pool at the step 334.

Following the step 336 is a step 338 where the sequence number of the new table or tree entry is set to the sequence number of the entry of the table 280 in memory that is being moved. Following the step 338 is a step 442 where the data in memory is copied to the logical device just as if the data were being written to the logical device. Following the step 342 is a step 344 where the memory entry is deleted (or possibly returned to a pool of free memory entries, as appropriate). Following the step 344, processing is complete. Note that the result of processing illustrated by the flow diagram 330 is similar to the result provided by processing illustrated by the flow diagram 220, described above, where data is written to a logical device without being first maintained in memory.

In some cases, it may be desirable to link a target volume for an otherwise targetless snapshot to provide a conventional snapshot volume. Although, as described elsewhere herein, it is possible to access different versions of targetless snapshots, providing a link for a targetless snapshot allows application access to the linked volume in a conventional manner.

Referring to FIG. 15, a diagram 360 illustrates creating a linked volume. The linked volume includes a table 362 that is similar to the other tables 72, 72' discussed elsewhere herein where a plurality of entries 364a-364f in the table 362 include pointers to data portions. In the case of a linked volume, each of the entries 364a-364f points to one of: an underlying logical volume 366 for which targetless snapshots are being provided, the data pool 110, or null (if the logical volume 366 is a thin volume). The entries 364d-364f that contain a "U" indicate that those particular entries are undefined. As discussed in more detail elsewhere herein, when a linked volume is first allocated, then entries in the corresponding table are all undefined. Subsequently, a process traverses the table and defines all the entries to point to the either underlying logical volume, the data pool, or, in the case of a thin logical volume, null (indicating an unallocated portion on the underlying thin logical volume). This is described in more detail elsewhere herein. The linked volume may correspond to a snapshot having a particular sequence number, which becomes the target global sequence number of the linked volume.

Figure 16:
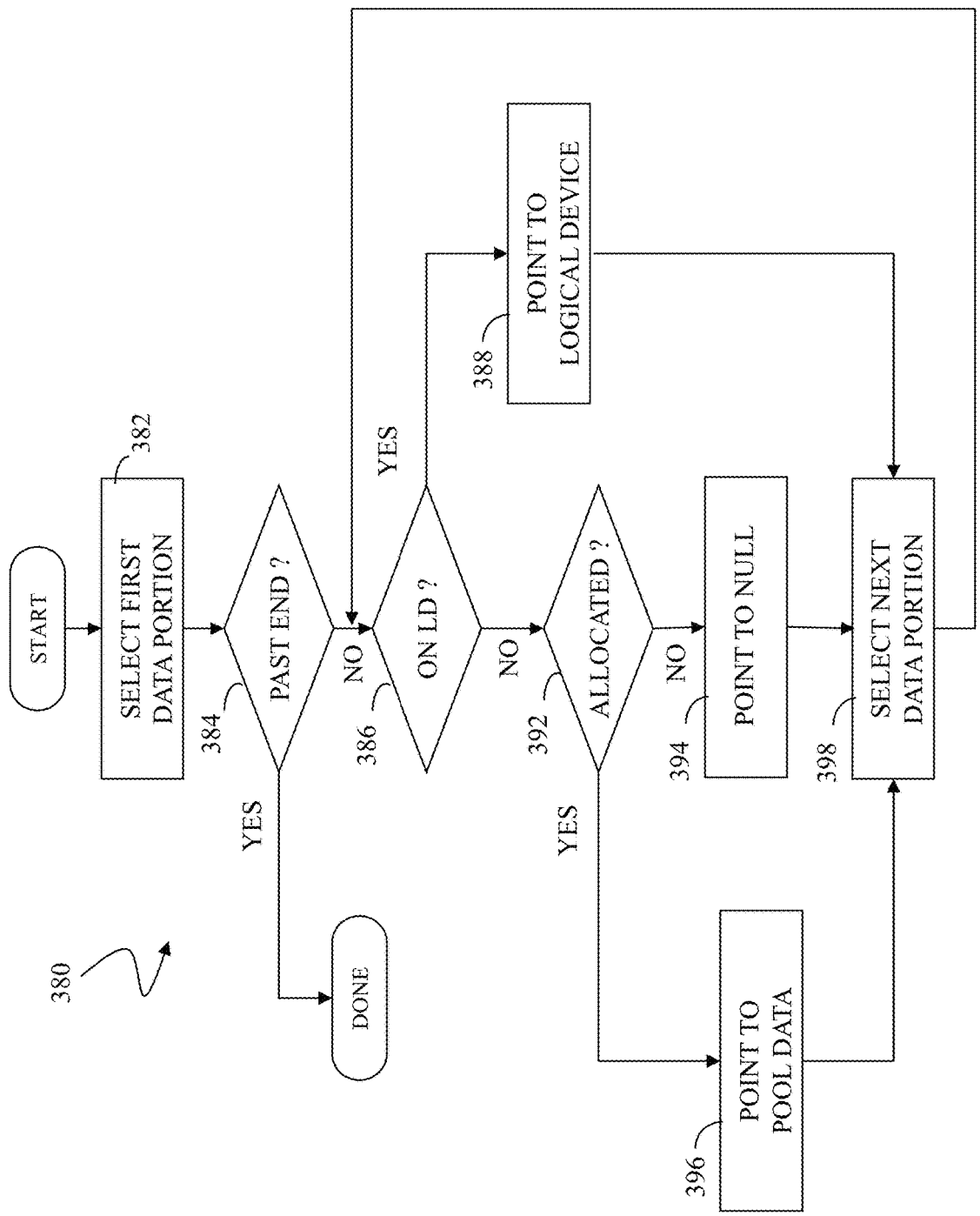
FIG. 16 is a flow diagram illustrating processing performed in connection with linking a logical volume to a targetless snapshot according to the system described herein.

Referring to FIG. 16, a flow diagram 380 illustrates processing performed in connection with traversing undefined entries in a table for a linked volume (like the table 362, discussed above) and causing the entries to be defined. Processing begins at a first step 382 where an iteration counter is set to point to a first one of the entries in the table. Following the step 382 is a test step 384 where it is determined if all of the entries in the table have been processed. If so, then processing is complete. Otherwise, control transfers from the step 384 to a test step 386 where it is determined if the data portion corresponding to the entry indicated by the iteration counter points to the underlying logical device. The determination at the step 386 is similar to processing for the flow diagram 250, discussed above, and depends upon the version number being linked.

If it is determined at the step 386 that the data portion corresponding to the entry indicated by the iteration counter points to the underlying logical device, then control transfers from the test step 386 to a step 388, where the corresponding table entry is set to point to the logical device. Otherwise, control transfers from the test step 386 to a test step 392 where it is determined if the data portion corresponding to the entry indicated by the iteration counter is allocated. If not, then control transfers to a step 394 where the corresponding entry in the table is set to null. Otherwise, control transfers to a step 396 where the corresponding entry in the table is set to point to the data pool 115. Following the step 396 is a step 398 where the iteration counter is incremented. Note that the step 398 also follows the steps 388, 394. Following the step 398, control transfers back to the step 384 for a subsequent iteration.

In some instances, it may be desirable to relink a logical volume from one targetless snapshot to another targetless snapshot. That is, a logical volume that has been or is in the process of being linked to a first snapshot may be unlink from the first snapshot and, at the same time, linked to a second, different, snapshot.

Figure 17:
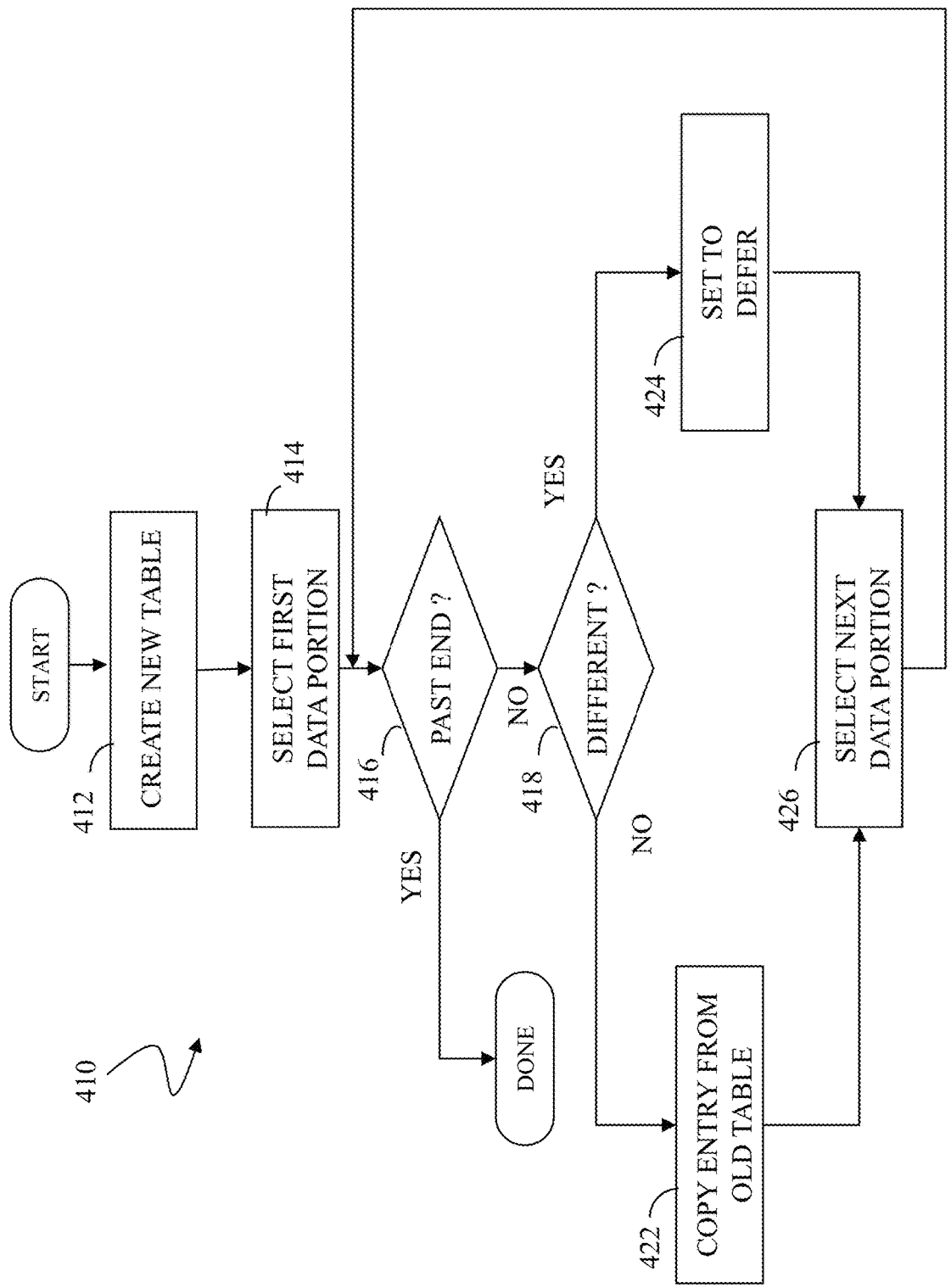
FIG. 17 is a flow diagram illustrating processing performed in connection with relinking a logical volume from a first targetless snapshot to a second targetless snapshot according to the system described herein.

Referring to FIG. 17, a flow diagram 410 illustrates processing performed in connection with relinking a logical volume from a first snapshot (first target global sequence number) to a second, different, snapshot (second target global sequence number). Processing begins at a first step 412 where a new table (like the table 362, discussed above) is created. When a logical device is relinked from one targetless snapshot to another, a separate table is maintained for each of the snapshots. Once all appropriate data is provided to the new table (corresponding to the second targetless snapshot), then the old table may be deleted. Following the step 412 is a step 414 where an iteration counter is set to point to a first one of the entries in the old table. Following the step 414 is a test step 416 where it is determined if all of the entries in the old table have been processed. If so, then processing is complete. Otherwise, control transfers from the step 416 to a test step 418 where it is determined if a table entry corresponding to the iteration counter is different between the old table and the new table. Note that, if data is written to the logical device for which targetless snapshots are being provided any time between the first targetless snapshot and the second targetless snapshot, then the corresponding entries in the old and new tables will be different. Note that, in some embodiments, any writes provided to the logical volume being relinked prior to the relinking may be discarded.

If it is determined at the step 418 that the table entry corresponding to the iteration counter is not different between the old table and the new table, then control transfers from the test step 418 to a step 422 where the table entry is copied from the old table to the new table. Otherwise, control transfers from the step 418 to a step 424 where the table entry corresponding to the iteration counter is set to indicate that entering the table entry is to be deferred to a later time. Setting the table entry to indicate that entering the table entry is to be deferred to a later time makes the transition occur more quickly. The table entry may be provided at a later time using, for example, processing similar to the processing illustrated in connection with the flow diagram 330, described above. Following the step 424 is a step 426 where the iteration counter is incremented. Note that the step 426 also follows the step 422. Following the step 426, control transfers back to the step 416 for a subsequent iteration.

As described above, a thin logical device, may be characterized as a virtually provisioned logical device where backing storage is provisioned or allocated on demand. In at least one embodiment, such provisioning of allocated storage mapped to a particular subrange of the thin device logical device address space may occur in response to a first or initial write to the subrange of the address space. As such, techniques herein may be described with respect to the thin logical device for purposes of illustration. However, techniques described herein are not limited to thin or virtually provisioned logical devices. More generally, techniques herein may be used in connection with other logical devices, such as a regular or conventional logical device where storage for the logical device's address space may be allocated upon creation of the logical device. Described above are data portions of a logical device. In following paragraphs, such data portions are referred to as tracks but more generally may be any suitable size denoting a portion of the logical device and its associated address space.

As also discussed above, a targetless snapshot may be created which results in a logical point in time copy of the source or primary device. The snapshot may be characterized as targetless in that it is not linked to target volume. As noted above, a targetless snapshot may be linked to a target volume that is presented to the host or other client so that the client may access data of the snapshot, such as perform read and/or write requests, with respect to the target volume. Targetless snapshots may be taken at desired points in time to provide logical point in time copies of the source logical devices for any suitable purpose.

In at least one existing implementation, snapshot activation for a targetless snapshot may be performed in a two-step or two-command sequence—create and activate. Consistent with discussion above, such as in connection with FIG. 9, reference is made to the example 500 of FIG. 18. The example 500 includes information for a single thin logical device prior to commencing the command sequence (e.g., prior to issuance of the create command). The example 500 includes track sequence numbers 502 denoting the current sequence numbers associated with the individual tracks of the logical device as in the sequence number table 130 of FIG. 8, element 510 denoting the tracks and associated data written to the logical device tracks at a point in time (e.g., structure similar to that as illustrated in FIG. 4) prior to issuing the create command, device sequence number 504 denoting the current global sequence number for the logical device, and element 512 denoting the snapshot table similar to element 120 of FIG. 7. At the first point in time illustrated in FIG. 18, there are no snapshots yet created or activated. In the example 500, there have been writes to tracks 1, 3, 4, 6 and 7 with the remaining tracks having no allocated storage since they have not yet been written to.

Figure 18:
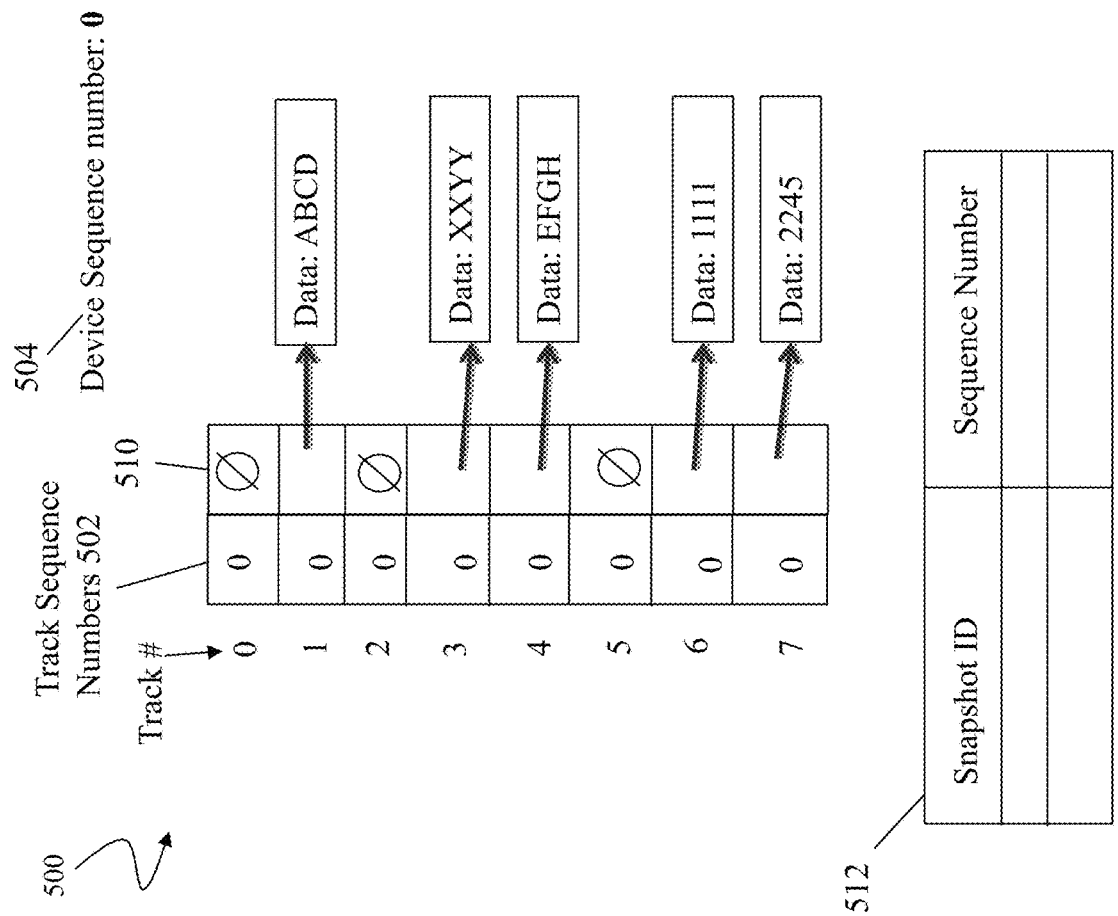
FIGS. 18-21 illustrate the state of structures used in connection with a logical device at various points in time in at least one embodiment in accordance with techniques herein.
Figure 19:
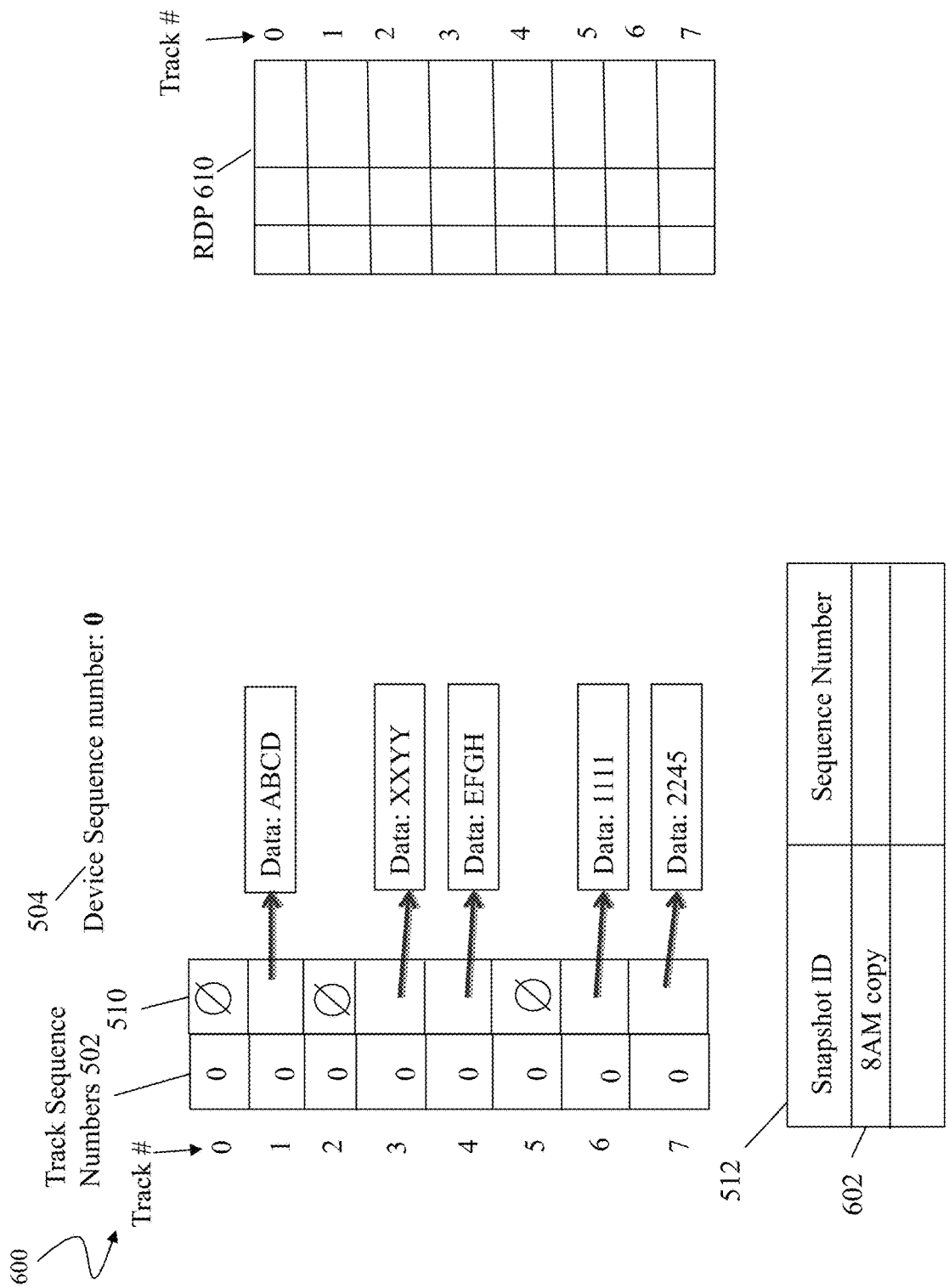

At a second point in time subsequent to the first point in time, a create command may be issued to create a snapshot of the logical device illustrated in connection with FIG. 18. In at least one implementation, responsive to the create command, processing may be performed as will now be described with reference to the example 600 of FIG. 19. Referring to FIG. 19, processing performed responsive to the create command may include allocating the replication data pointers (RDP) table or structure 610, locating an empty slot or entry 602 in the table 512, and setting the snapshot ID of entry 602 to the user-specified snapshot identifier. In at least one embodiment, the create command and also the activate command may have associated defined interfaces or APIs (application programming interfaces) which may include input and/or output/return parameters. In at least one embodiment, the create command API or interface may include an input parameter where the user specified the snapshot ID as stored in element 602 for the snapshot being created. The RDP table or structure 610 may denote an instance of the structure as described in connection with FIGS. 5A and 5B. Consistent with discussion above, RDP 610 may include different versions of data and associated device sequence numbers for each of the tracks of the logical device.

Figure 20:
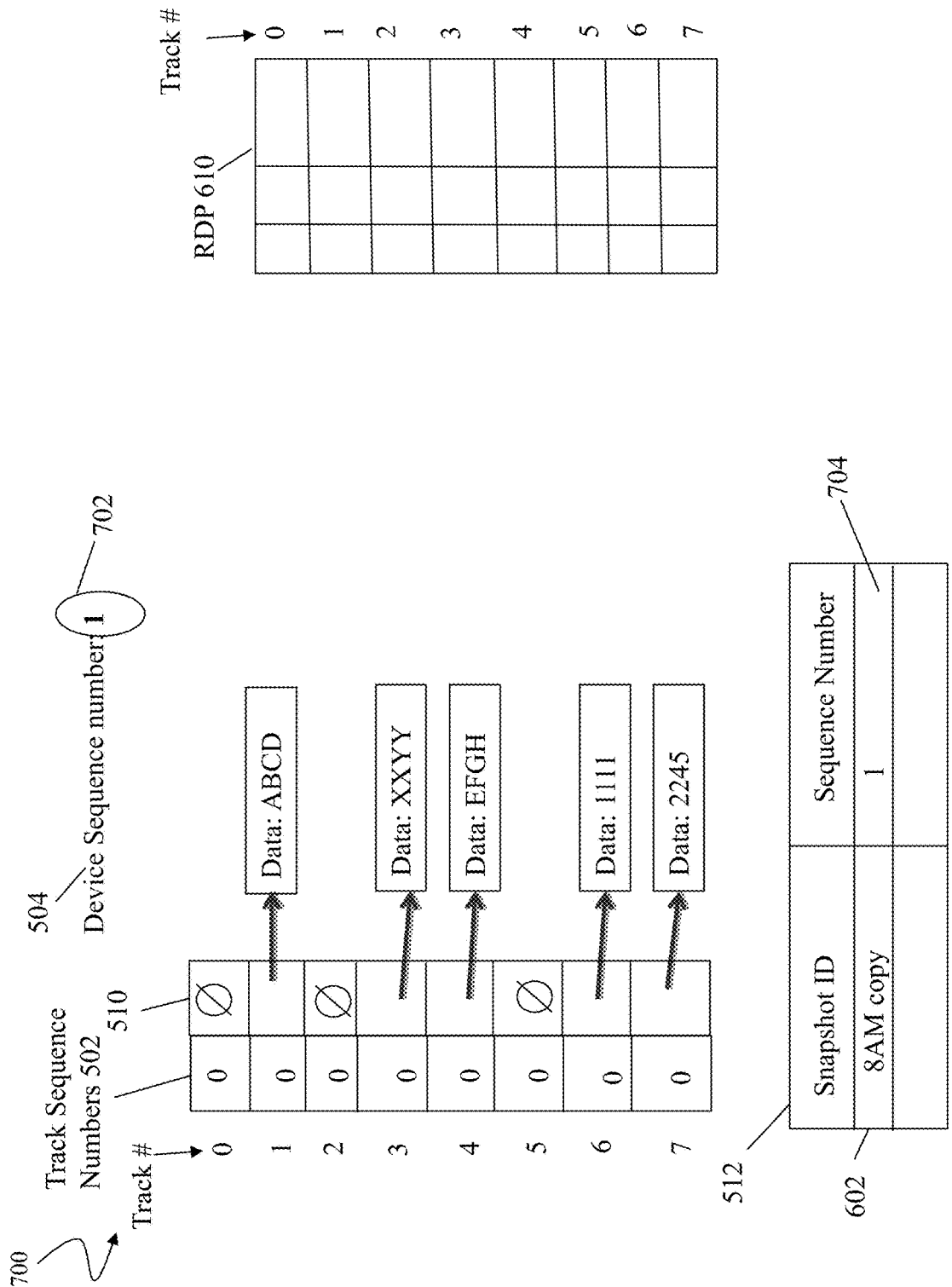

At a third point in time subsequent to the second point in time, an activate command may be issued to activate the snapshot of the logical device previously created in connection with FIG. 19. In at least one implementation, responsive to the activate command, processing may be performed as will now be described with reference to the example 700 of FIG. 20. Referring to FIG. 20, processing performed responsive to the activate command may include incrementing the device sequence number 504. In this example, element 702 denotes the updated device sequence number from 0 (as in FIG. 19) to 1. Processing may also include assigning the current device sequence number 702 to the new snapshot being activated. Element 704 denotes the current device sequence number 702, having a value of 1, copied into the table entry 602 for the first snapshot activated.

Figure 21:
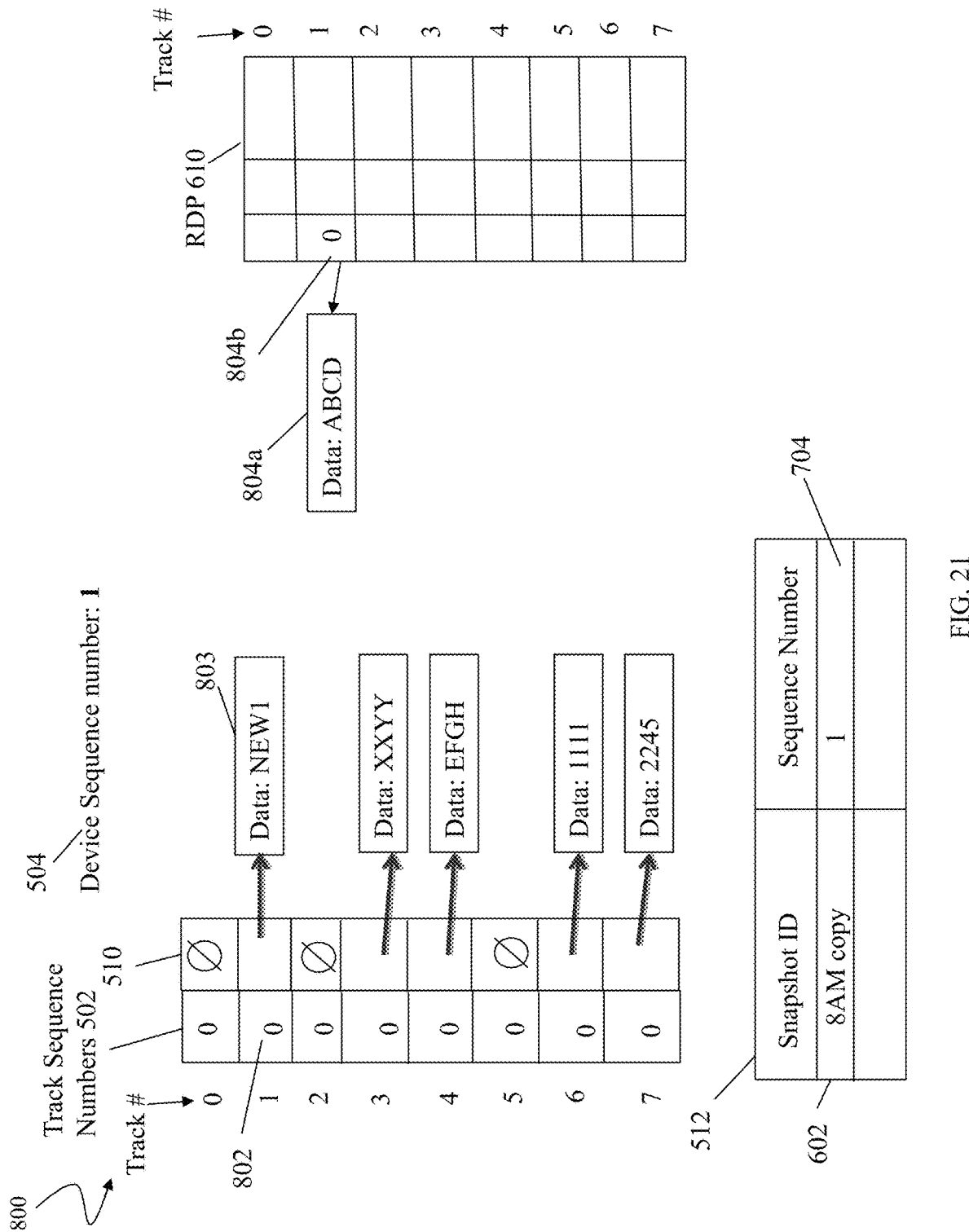

Once the activation of the snapshot of FIG. 20 has completed, writes to the source logical devices may be made. With reference to FIG. 21, illustrated is an example of writing to the source device whereby the write is intercepted to perform processing to preserve any existing data needed prior to storing the new write data to a target location. Such synchronous intercept upon a write to the source device, and the associated processing performed responsive to intercepting the write, is described elsewhere herein (e.g., such as in connection with FIG. 10). Processing performed responsive to the write in this example is illustrated in connection with FIG. 21. In the example 800, a write may be issued that writes the data NEW1 to track1 of the source logical device. As illustrated in FIG. 20, prior to the write, track 1 includes the data ABCD. Responsive to the write being received, the write is intercepted to perform processing prior to overwriting existing track 1 data ABCD with the new write data NEW1. In this case, consistent with discussion above regarding FIG. 10, the track 1 sequence number denoted by 802 is 0 which does not equal the current device sequence number 1. In this case, processing is performed to save the existing track 1 data ABCD prior to overwriting the NEW1. Saving the existing track 1 data includes obtaining an entry from the RDP 610 for track 1. In this example element 804a,804b denote the information stored in the RDP entry—element 804a denotes the location of the saved content ABCD and 804b denotes the associated sequence number 0 of the saved content of the entry. Subsequently, the track sequence number 802 is updated from 0 to 1 (the current device sequence number 504), and the write data NEW1 is written to track 1 803. Element 803 denotes the updated track 1 after NEW1 is written to track 1. Additionally, if a second write is now issued that writes to track 1, in this case the track sequence number of 1 for track 1 is the same as the device sequence number 1. The second write data may be simply overwritten over NEW1.

Consistent with discussion above, if there is a write to an unallocated track, such as track 0, the write data is the first or initial write to the track 0, where the write data is written to the track 0 (e.g., written to a newly allocated storage portion for the track) and an indicator may be saved to RDP 610 for track 0, where indicator denotes track 0, sequence 0, is an unallocated track that has not ever been written to.

In connection with at least one existing implementation, the create and activate command may both include interfaces or APIs where the command may be executed with respect to many logical devices for which snapshots are to be created. In such an implementation, snapshot activation may be performed with the assistance of an enginuity consistency assist (ECA) feature, or more generally consistency feature, which provide for consistent activation among all the group of one or more logical devices specified in the activation command API call. Writes to the group of one or more logical devices may be paused or held while the activation processing performed in connection with maintaining dependent write order consistency on logical devices of the group. Such consistent activation among the group is needed, for example, to create a restartable image of a database at a specific point in time as stored on logical devices of the group. Once activation has completed for all logical devices of the group, writing to the group of logical devices may be resumed. The time period for activation may thus vary depending on the number of logical devices in the group. More specifically, the time period for activation increases with the number of logical devices in the group. In some cases, the group of devices to be activated may include thousands or even tens of thousands of logical devices to be activated and writes may be held or paused, for example, on the scale of seconds (e.g., 3, 4 or more seconds). During this activation time period in which writes are paused and not allowed to proceed to the group of devices, the issuing host(s) or client(s) may experience adverse effects, such as I/O timeouts (e.g., since the issuing client may not receive acknowledgement regarding completion of the write within a specified timeout period), increased response times thereby adversely impacting write or I/O performance, and the like. Thus, the existing implementation may experience scalability problems as the number of logical devices to be activated increases.

As such, described in following paragraphs are techniques that may be used in connection with the create and activate commands issued, respectively, to create and activate a snapshot which shorten or reduce the above-noted time period of activation when writes to the group are paused or held. Such techniques described herein provide a benefit of minimizing or reducing the adverse impacts of a larger time period (during which writes are paused or held) as noted above. Additionally, techniques herein provide a more consistent and quicker activation time as compared to at least some embodiments not using techniques herein (e.g., such as an existing implementation which has a time period during which writes are paused or held as described in connection with FIG. 20).

For a received write operation writing to a target track, processing referred to herein as writing to the source device with synchronous intercept is performed when the current device sequence number does not equal (e.g., is greater than) the sequence number of the target track. Writing to the source device with synchronous intercept that may be performed in at least one embodiment is illustrated by example herein, for example, with reference to FIG. 21 above when NEW1 (sequence 1) is written to track 1 overwriting existing content ABCD (sequence 0). In at least one embodiment, writing to the source device with synchronous intercept may refer to processing as described herein in connection with FIG. 10, such as when step 222 evaluates to no and steps 226, 228, 232, 234, and 224 are performed. Writing to the source device with synchronous intercept is only performed/triggered for the first write per track after a snapshot is activated. Additionally, as described in following paragraphs in connection with examples illustrating use of techniques herein, the overall processing performed in connection with FIG. 10 flowchart is referred to as additional write processing which handles processing of an incoming write received where the write is directed to a source device of a snapshot. As described in connection with FIG. 10 elsewhere herein, such write processing determines whether or not it is required to perform writing to the source device with synchronous intercept, whereby processing saves or preserves (e.g., by storing in the RDP 610) existing data of a track being written to prior to overwriting the new write data to the track. As described in more detail below in connection with at least one embodiment in accordance with techniques herein, such additional write processing of FIG. 10 may be performed in addition to other conditions and processing steps responsive to receiving a write.

Figure 22:
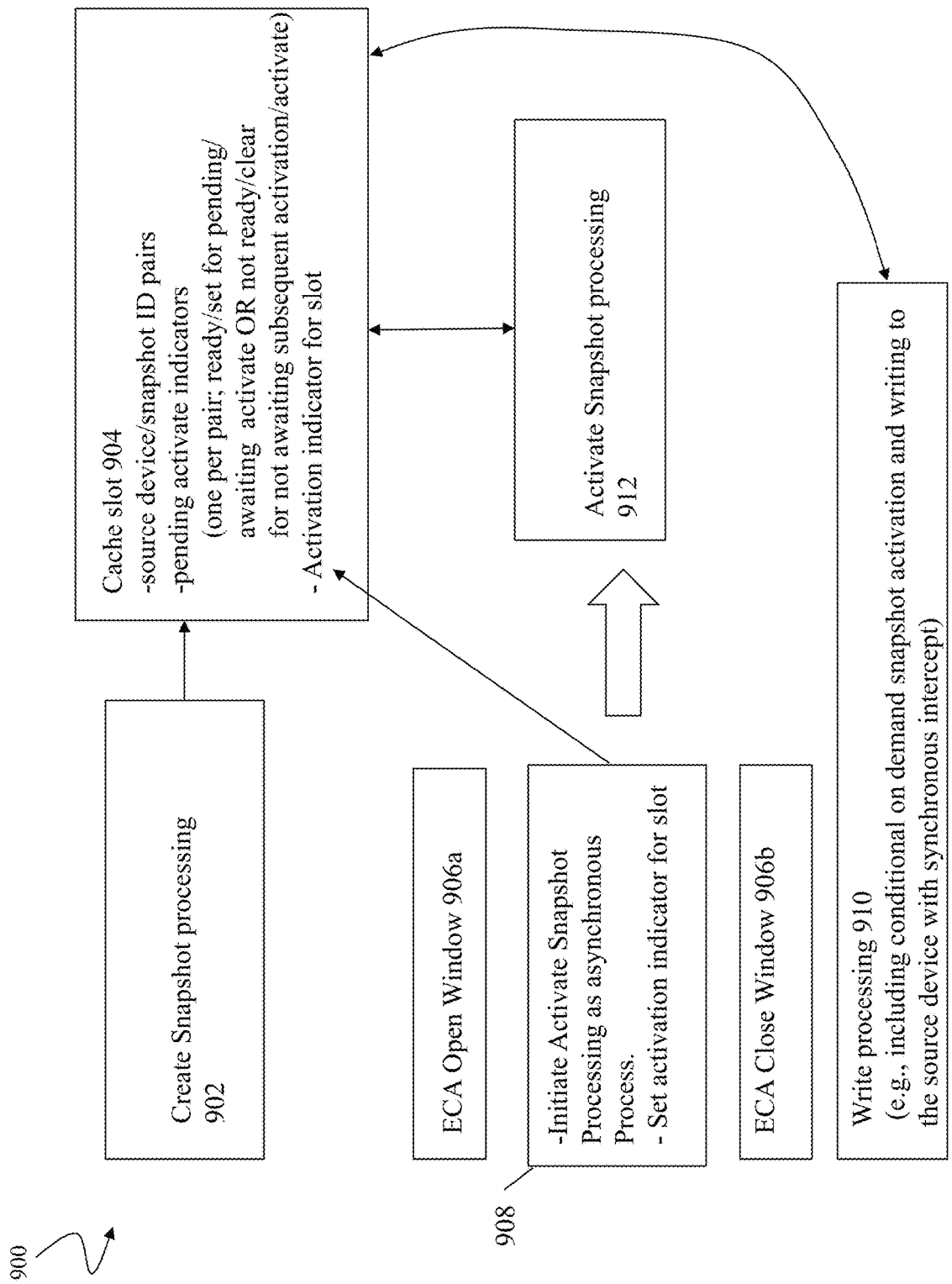
FIG. 22 illustrates components and general workflow in at least one embodiment in accordance with techniques herein.

Referring to FIG. 22, shown is an example illustrating a general processing flow between different components in at least one embodiment in accordance with techniques herein. The example 900 includes create snapshot processing 902, cache slot 904, ECA open window 906a, ECA close window 906b, initial activate code sequence 908, activate snapshot processing 912, and write processing 910. In connection with the example 900, a high level or overview is initially described with additional more detail provided below in following paragraphs and figures. Create snapshot processing 902 includes code executed responsive to receiving a create command to create a snapshot of a source logical device (or source device) provided as an input parameter. In at least one embodiment, the create command may be a system call performed, for example, in connection with a call or request from a user interface such as of a management application, command, file, and the like, to create a snapshot of a source device. Input parameters provided by the create interface may include the source device, and the snapshot ID to be given to the snapshot of the source device (e.g., snap (source device)) being created. In at least one embodiment, create snapshot processing 902 includes storing information in a buffer or memory location used as a temporary scratch location for use with techniques herein. In at least one embodiment, the buffer or memory location may be cache slot 904 and the information stored in the cache slot may include a pair identifying the source device and associated snapshot ID given to the snapshot created. Generally the cache slot 904 may be used to store multiple such pairs for multiple snapshots created in connection with one or more create snapshot calls. Create processing 902 may include performing processing as described elsewhere herein where an entry in the snapshot table 512 is reserved, and where processing includes storing the snapshot ID into the entry reserved. Create processing 902 in accordance with techniques herein also includes setting a pending activate indicator associated with the pair of source device/snapshot ID just stored in the cache slot 904. Generally, each pair of the source device/snapshot ID for which a create snapshot is issued has its own pending activate indicator. The pending activate indicator for a source device/snapshot ID pair may be set after create processing 902 has completed reserving the entry in the snapshot ID table 612 and after also writing the snapshot ID in the reserved entry for the snapshot. Otherwise, the pending activate indicator for a source device/snapshot ID pair is clear indicating that create snapshot processing for the associated or corresponding pair has not yet been completed (is not ready, or waiting, for subsequent activation). As described in more detail below, the pending activate indicator for a pair is used to signal or notify the activate snapshot processing 912 that the create processing 902 for the pair has completed and the pair is now awaiting subsequent activation via receiving a subsequent activate command for the pair. It should be noted that in at least one embodiment, the pending activate indicators may be stored in source device metadata associated with the source device and its snapshot. As an alternative, or in addition, the pending activate indicators may be stored in the cache slot or another suitable location.

In connection with techniques herein, an activation indicator or bit may be associated with the cache slot including the list, or more generally, one or more pairs of source device/snapshot IDs for snapshots created. The activation indicator may be set or clear. The activation indicator for the cache slot is initialized to clear, such as when the cache slot is initially allocated for use by the create snapshot processing to store the pairs of source device/snapshot IDs. An activation indicator that is clear means that an activate command has been received and activation processing 912 has commenced for pairs in the cache slot. In at least one embodiment, a handle (e.g., pointer, identifier, token) may be associated with the cache slot 904 uniquely identifying the cache slot 904 from other possible cache slots. The handle may be used to refer to the cache slot and thus the complete list of possibly multiple pairs of source device/snapshot IDs stored in the cache slot in connection with one or more create snapshot processing calls 902. Once the list of desired source device/snapshot IDs have been stored in the cache slot 904 having the handle, the handle to the cache slot may then be provided as an input parameter with the activate command which triggers execution of the code module 908 (e.g., process, thread, or other code entity 908) to commence or initiate activation processing to activate all snapshots denoted by the snapshot IDs of the pairs included in the cache slot. In at least one embodiment in accordance with techniques herein, code module 908 initiates activation processing by initiating execution of an asynchronous process 912 to activate the snapshots of the cache slot. In at least one embodiment, the asynchronous activate processing 912 may execute as a background process, for example, having lower priority relative to other routine code entities executing in the data storage system, such as in connection with I/O processing of the data path. In this manner, in at least one embodiment, the asynchronous processing 912 may execute at times when the one or more CPUs of the data storage system are idle or have a low utilization in efforts to minimize impact on the data path. As known in the art, the data path or I/O path is the runtime call stack or chain of code executed in connection with performing I/O processing of a received client I/O (e.g., such as to read and/or write data to a storage entity (e.g., block-based I/O directed to a logical device, or file-based I/O directed to a file-based entity such as a file, file system, or directory).

Elements 906a-906b define the activation or ECA window during which writes to the one or more source devices identified in the cache slot 904 are temporarily held or paused. As discussed above, a goal and advantage of techniques herein is to reduce or minimize the window of time/time period between 906a-b during which writes to the one or more source devices of cache slot 904 are held or paused. In particular, Open ECA window 906a denotes the starting point or commencing of the time period during which any subsequently received write to any source device identified in the pairs of the cache slot 904 is held. Close ECA window 906b denotes the ending point of the time period. Thus, once execution of code 908 to initiate activation processing has completed, writing may be resumed with respect to the source devices identified in the pairs of the cache slot 904. In at least one embodiment, writes received during the time period 906a-b may be queued (e.g., possibly have a maximum limit or number of queued writes to limit resources such as memory allocated for this purpose). Once writes to the source devices of 904 are resumed at the end of the time period as denoted by 906b, the queued pending writes may be serviced, along with other subsequently received writes. As a variation, an embodiment may alternatively choose not to queue held writes during the time period 906a-906b whereby no acknowledgement is returned to the host or other client regarding the held writes. In this case, the host or other client may simply reissue such writes after the time period end 906b where the writes are then allowed and serviced.

In the embodiment described in connection with the example 900 in accordance with techniques herein, the time period between 306a-b is reduced due to the asynchronous activate process 912 initiated by code module 908. As described in more detail below, the asynchronous activate process 912 performs the activate/activation processing to activate the snapshots of the cache slot 904, as opposed to at least one alternative implementation in which code of 908 would perform the activate/activation processing to activate the snapshots of the cache slot 904. Thus, the time period 906a-b during which writes to the source devices of 904 are held is reduced in comparison to such other alternatives, such as where the code of module 908 would otherwise perform the activate/activation processing of 912, inline, to activate the snapshots of the cache slot 904.

Write processing 910 may be performed in connection with writes received. The write processing 910 includes performing any needed conditional on-demand snapshot activation as well as the additional write processing of FIG. 10. In at least one embodiment, the asynchronous activate snapshot processing 912 may traverse the list of pairs in the cache slot 904 and perform activation processing for each such pair. Once execution of the asynchronous process 912 has commenced, but prior to completing activation of all snapshots of 904, a write may be received that is directed to a source device of a particular one of the snapshots of 904 for which activation processing has not yet completed. The source device and the particular one of the snapshots may have an associated "pending activate" indicator that is set (e.g., denoting create processing has completed for the particular snapshot) and for which an activation indicator is set (e.g., denoting that an activate command has been received for the particular snapshot) but where snapshot activation processing has not yet been completed for the particular snapshot. In this case, processing of 910 may include performing on-demand snapshot activation processing for the particular snapshot, prior to performing additional write processing such as described in connection with FIG. 10. Write processing 910 and on-demand activation of a snapshot are described in more detail below. It should be noted that the pending activate indicator and activation indicator are discussed in more detail elsewhere herein.

Figure 23:
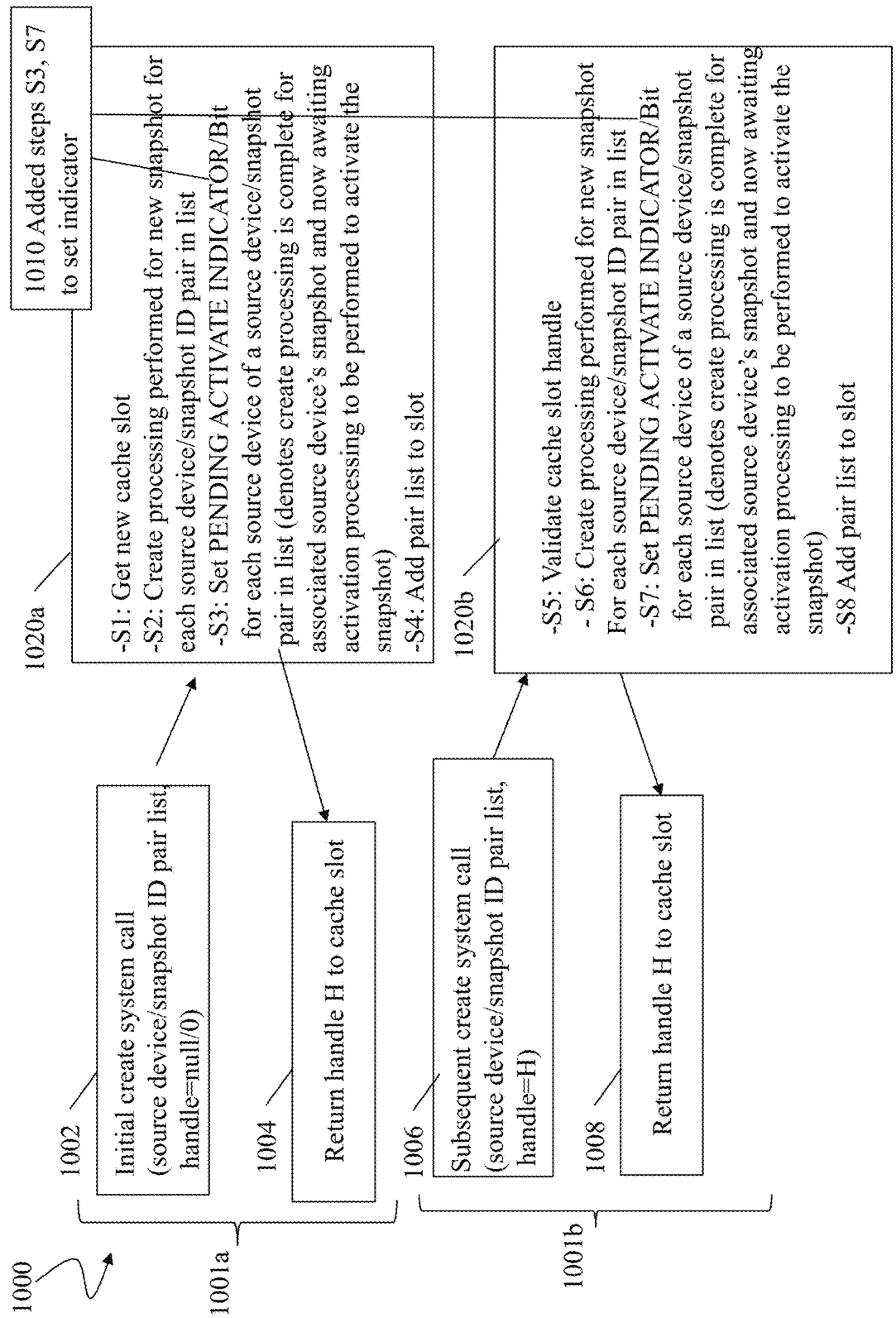
FIGS. 23, 24, 25, 26 and 27 illustrate additional detail and processing steps that may be performed in an embodiment in accordance with techniques herein.

Referring to FIG. 23, shown is an example 1000 illustrating use of create processing system call in an embodiment in accordance with techniques herein. The example 1000 illustrates 1001a a first or initial call to 1002/return from 1004 the create system call to perform create snapshot processing 902, and 1001b a subsequent call to 1006/return from 1008 the create system call to perform create snapshot processing 902. In at least one embodiment, an initial call 1002 may be made using the create system call in which a list of one or more source device/snapshot ID pairs are specified as an input parameter. Call 1002 may be made as an initial call with respect to the first time any source device/snapshot ID pair is placed in a new cache slot. Responsive to the call 1002, element 1020a denotes processing performed by the create snapshot processing module 902. Element 1020a processing includes first performing step S1, obtaining a new cache slot, and then step S2 performing create processing for the snapshot of each source device/snapshot ID pair of the input parameter list. Consistent with discussion elsewhere herein, create snapshot processing S2 performed for each snapshot of a pair of the input list may include reserving an entry in the snapshot ID table 512 of the source device, and then storing the snapshot ID of the pair in the reserved entry. Additionally, subsequent to S102, processing of 1020a may include 1010 (S3) that sets the pending activate indicator or bit for each pair in the list for which create snapshot processing has just been performed. In particular, S4 may include setting the pending activate indicator/bit for each source device of a source device/snapshot pair in the list to denote create processing is complete for the associated source device's snapshot and we are now awaiting activation processing to be performed to activate the snapshot. From S3, processing of 1020a may also include then performing S4 adding the list of source device/snapshot ID pairs to the cache slot (allocated in S1). Once processing of 1020a has completed after S4, a handle H to the cache slot (allocated in S1 and updated in S4) may be returned 1004 to the caller and used in connection with one or more subsequent call instances 1001b to add additional source device/snapshot IDs pairs to the cache slot H.

In at least one embodiment, a second or subsequent call 1006 may be made using the create system call in which a list of one or more source device/snapshot ID pairs are specified as an input parameter. Additionally the handle H (as returned in 1004) is now specified as an input parameters of call 1006. Call 1006 may be made as an invocation subsequent to the initial call 1002 to place additional source device/snapshot ID pairs in the cache slot denoted by handle H. Responsive to the call 1006, element 1020b denotes processing performed by the create snapshot processing module 902. Element 1020b processing includes performing step S5 to validate the cache slot handle, and then step S6 (similar to S2) performing create processing for the snapshot of each source device/snapshot ID pair of the input parameter list. Consistent with discussion elsewhere herein, create snapshot processing S6 performed for each snapshot of a pair of the input list may include reserving an entry in the snapshot ID table 512 of the source device, and then storing the snapshot ID of the pair in the reserved entry. Following S6, processing of 1020b may include then performing 1010 (S7, similar to S3) that sets the pending activate indicator or bit for each pair in the list for which create snapshot processing has just been performed. After S7, processing of 1020b may also include S8 (similar to S4) adding the list of source device/snapshot ID pairs to the cache slot. Once processing of 1020b has completed (e.g., after S8), the handle H to the cache slot (updated in S8) may be once again returned and used in connection with one or more subsequent call instances 1001b to add additional source device/snapshot IDs pairs to the cache slot H.

It should be noted that the subsequent create call 1001b may be, optionally, made to add additional device/snapshot pairs to an existing cache slot used in connection with a prior call 1001a. Furthermore, and more generally, an embodiment may repeat create processing such as described in connection with 1001a (and optionally 1001b) for use in connection with allocating and using other cache slots.

Figure 24:
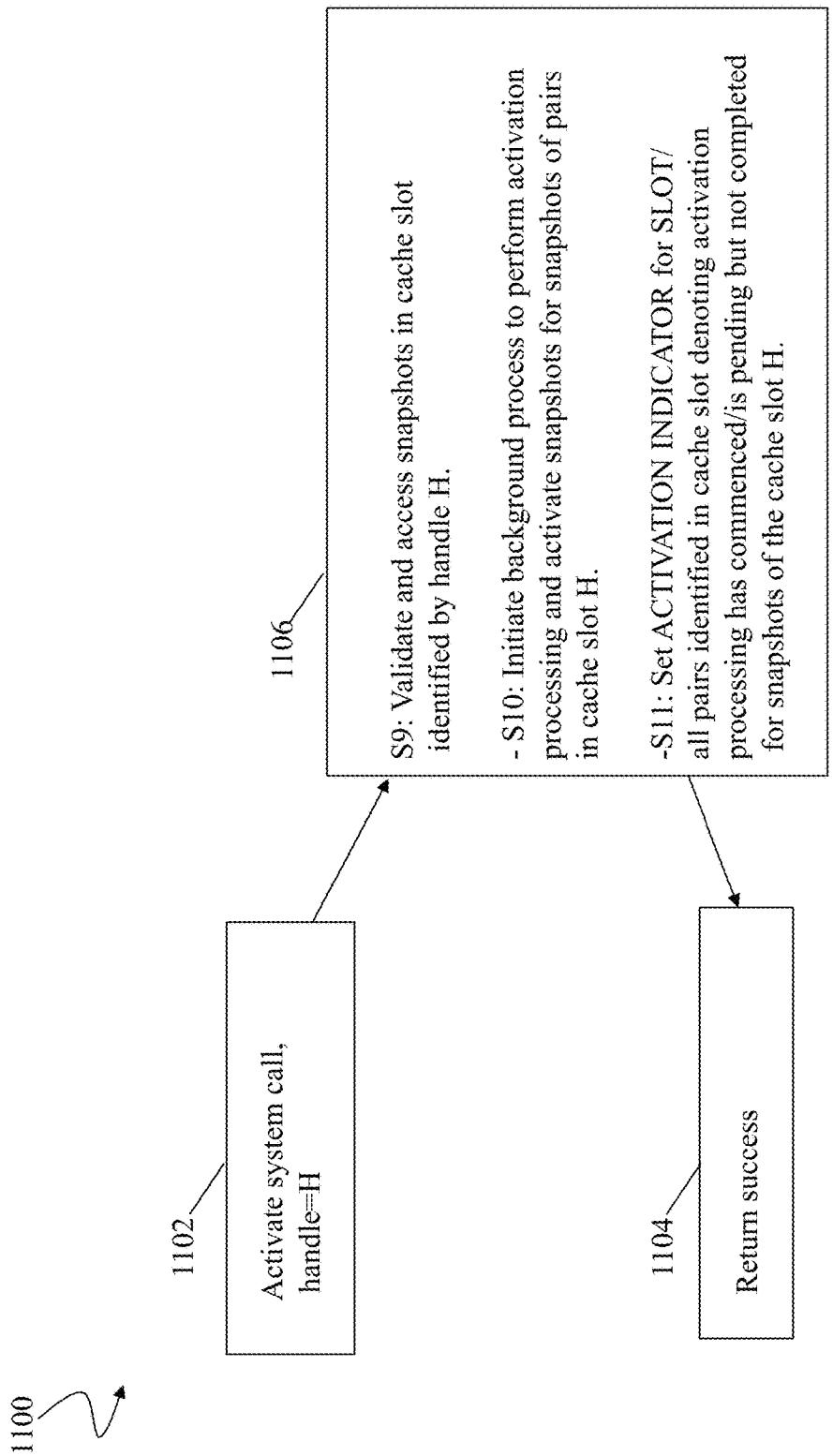

Referring to FIG. 24, shown is an example illustrating processing that may be performed to initiate activation processing in at least one embodiment in accordance with techniques herein. The example 1100 denotes processing steps that may be performed by code 908 of FIG. 22 in connection with a system call to activate one or more snapshots. Element 1102 denotes the system call made where the handle H, to the cache slot identifying the one or more snapshots to be activated, is provided as an input parameter. Responsive to call 1102, processing of 1106 may be performed. Processing of 1106 may include S9 that validates the handle H and accesses the snapshots in the cache slot identified by H. Following S9, processing of 1106 may include performing S10 that initiates the asynchronous background process 912 that performs activation processing to activate snapshots of the pairs in cache slot H. Following S10, processing of 1106 may include performing S11 that sets the activation indicator for the cache slot H (provided as an input parameter on the call 1002). Consistent with discussion elsewhere herein, the activation indicator associated with the cache slot H indicates that activation processing has commenced/is pending but not completed for snapshots of the cache slot H. Upon completion of processing 1106 (e.g., after completing steps S9, S10, S11), control may be returned 1104 where such a return may denote the status (e.g., success, failure) of the activate command. In at least one embodiment, the return 1104 may also include a return or output parameter of H (provided as an input parameter of the call 1102).

Figure 25:
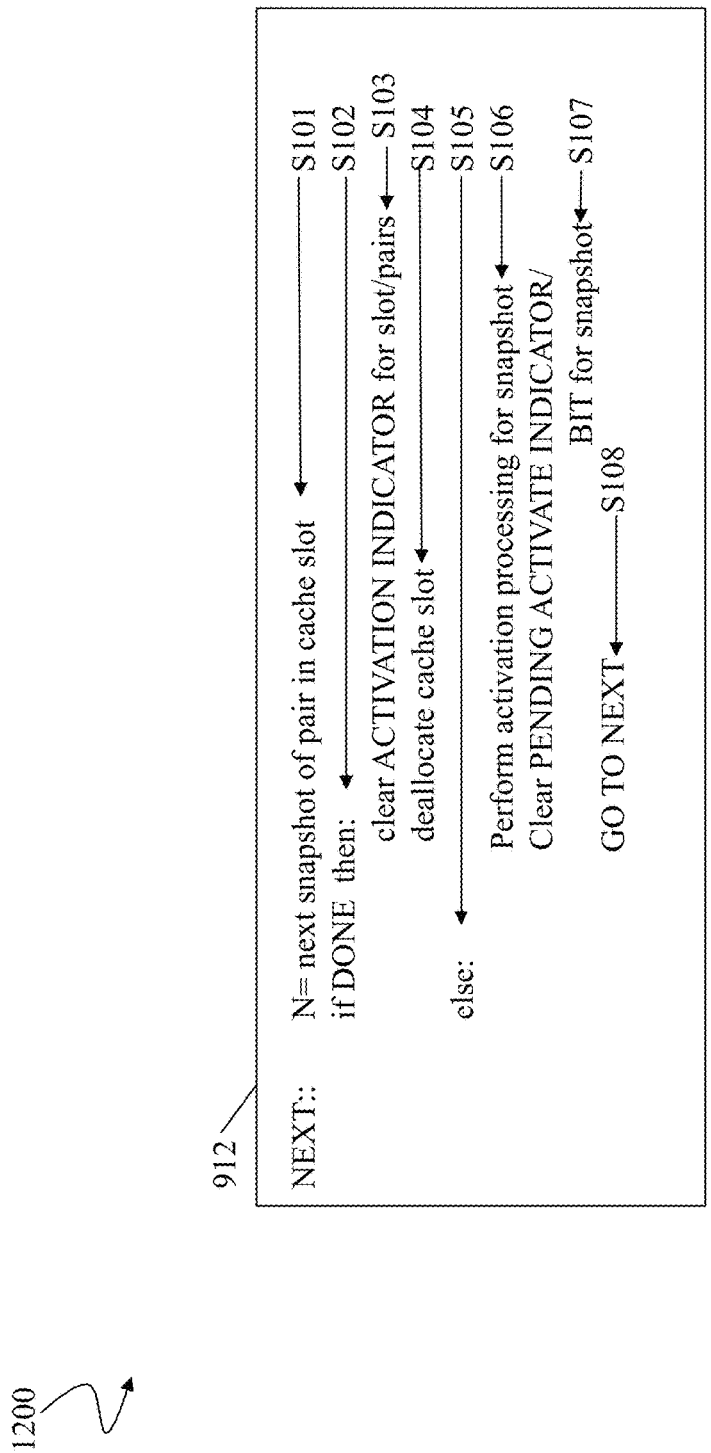

Referring to FIG. 25, shown is an example 1200 illustrating processing that may be performed as part of the asynchronous background process to activate snapshots of the cache slot in at least one embodiment in accordance with techniques herein. The example 1200 illustrates more detail of processing steps that may be performed by the initiated process denoted as element 912 of FIG. 22. In step S101, N may be assigned the next snapshot of the next pair in the cache slot H. From S101, control proceeds to S102. At step S102, a determination is made as to whether processing is completed for all snapshots/pairs of the cache slot. If step S102 evaluates to yes (done with all snapshots of cache slot H), processing proceeds to step S103 to clear the activation indicator for the slot and then S104 deallocate the cache slot. If step S102 evaluates to no/false, control transfers to the else portion S105 including steps S106, S107 and S108. In step S106, activation processing is performed for the snapshot denoted by the current value of N. Activation processing for the snapshot denoted by N is described elsewhere herein. In at least one embodiment activation processing for the snapshot denoted by N includes incrementing the device sequence number of the source device (included in the source device/snapshot ID pair for the snapshot N, where snapshot ID denotes the snapshot N), and then storing the device sequence number in the snapshot table 512 for the source device. From S106 control proceeds to S107. In step 107, processing is performed to clear the pending activate indicator or bit for the snapshot denoted by B. From S107, control proceeds to S108.

Upon completion of the "else: steps S106, S107, control proceeds to step S108 to return to NEXT at S101 to process any remaining snapshots of the cache slot H.

Figure 26:
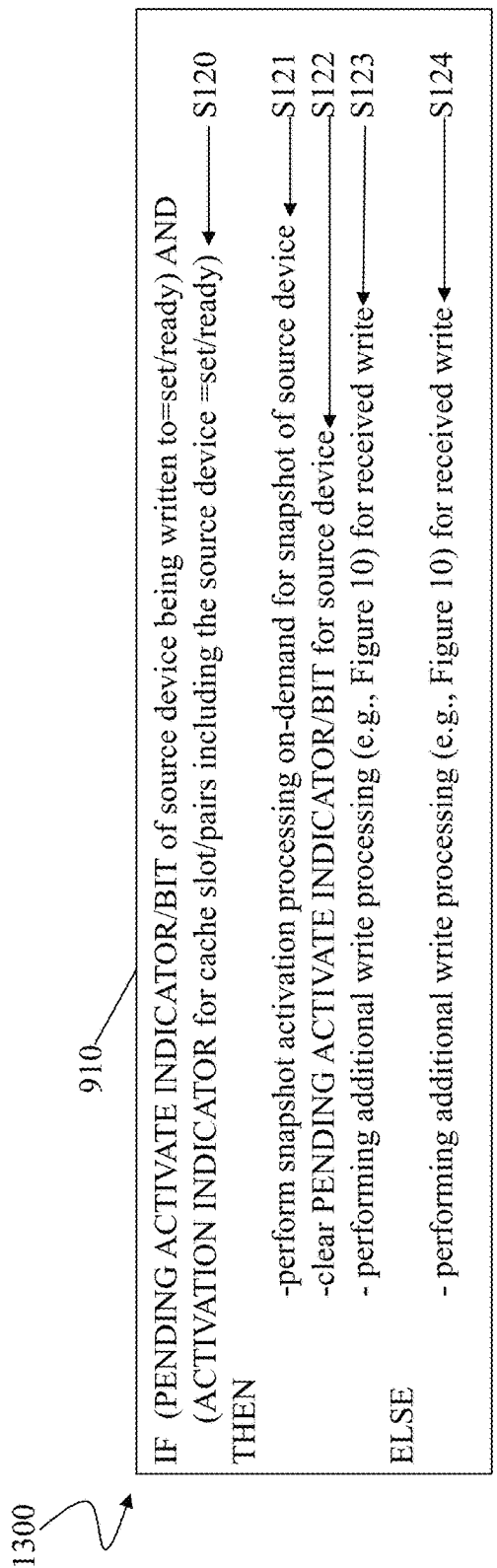

Referring to FIG. 26, shown is an example 1300 illustrating processing that may be performed as part of write processing 910 of the cache slot in at least one embodiment in accordance with techniques herein. The processing of the example 1300 is performed responsive to receiving a write that writes to a source device. Processing of 910 may include performing the determination at step S120 to determine whether the pending activate indicator/bit for the source device being written to has a value of set or ready (e.g., =1 denoting that create snapshot processing has completed for a snapshot of the source device and processing is now awaiting for the snapshot to be activated) and also whether the activation indicator for the cache slot of pairs including the source device has a value of set or ready (e.g., =1 denoting that the activate command has been received for the cache slot to activate the snapshots of the pairs stored in the cache slot, where the background processing 912 performed to perform snapshot activation/activate processing for each snapshot of the slot has not yet activated the snapshot of the source device). If step S120 evaluates to true, processing proceeds to step S121 to perform snapshot activation processing on-demand for snapshot of source device. The snapshot activation processing is described in more detail elsewhere herein. The snapshot activation processing of S121 includes incrementing the device sequence number of the source device and storing the updated device sequence number in the reserved entry of the snapshot table 512 associated with the snapshot being activated. S121 may be characterized as on-demand activation since activation of the snapshot is being taken out of processing order as would otherwise be performed by the asynchronous background process 912. Activation of the snapshot of the source device being written to is triggered by the write received that writes to the source device. Also, at most one write per source device will have to do this on-demand activation, and other steps S122 and S123. The background activation process 912 will also clear the pending activate indicator/bit for the source device, so if this happens first, then the write I/O is not impacted (e.g., does not result in S120 evaluating to true and therefore does not result in performing "then" processing steps S121, S122, S123). From S121, control proceeds to S122 to clear the pending activate indicator/bit for the source device. From S122, control proceeds to S123 to perform additional write processing for the received write. The additional write processing is that processing illustrated and described elsewhere herein in connection with FIG. 10.

If S120 evaluates to no/false, control proceeds to S124 to perform additional write processing for the received write. The additional write processing is that processing illustrated and described elsewhere herein in connection with FIG. 10.

Consistent with discussion herein, a handle denotes a particular cache slot including one or more pairs of snapshot ID/source devices. Further, a pending activate indicator/bit is associated with each such pair where the indicator/bit is set in connection with create system call processing steps S3 and S7. In at least one embodiment, the handle of the cache slot may be stored with each of the pending activate indicators/bits. However, more generally, an embodiment may use any suitable technique to obtain the cache slot handle, and its activate indicator, that may be associated with a source device, and its associated pending activate indicator/bit.

Generally, an embodiment in accordance with techniques herein may include any suitable restrictions or limitations that may vary with embodiment. For example, assume create and activate commands have been issued in connection with a first snapshot, SNAP1, of a source device. However, activation processing for the first snapshot has not yet completed. Now a create command is received to create a second snapshot, SNAP2, of the same source device prior to completing activation processing for the first snapshot. In at least one embodiment, the create command for the second snapshot of the source device may be another trigger resulting in on-demand activation of the source device. This will now be described with reference to FIG. 27.

Figure 27:
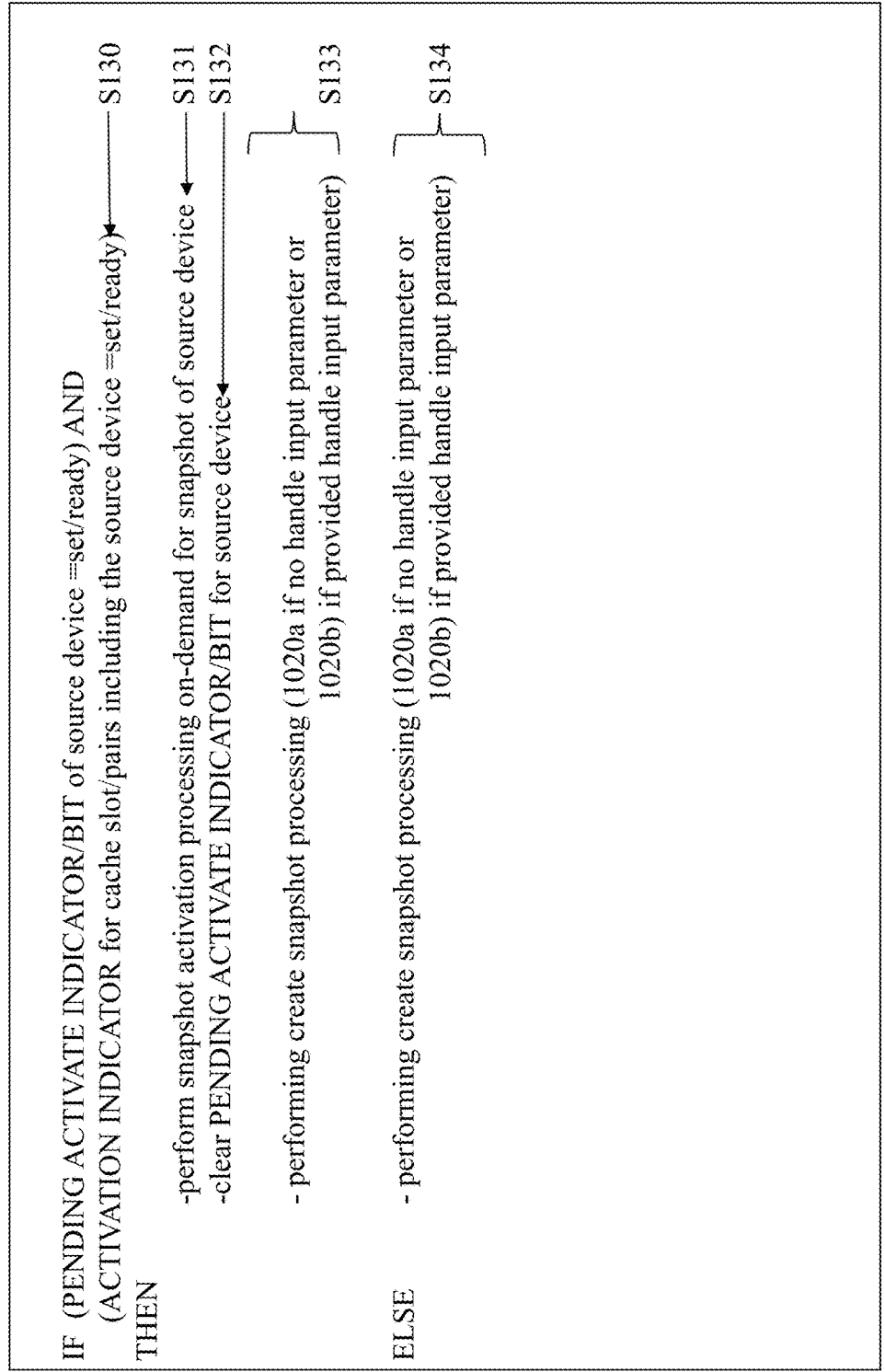

Referring to FIG. 27, shown is an example 1400 of processing that may be performed in an embodiment in accordance with techniques herein. The processing of 1400 may be performed in connection with a create command or system call that is received to create a snapshot (e.g. SNAP2) of a source device. S130 expresses the conditions or states that, when evaluated to true, denote the case where a create command/system call to create a prior snapshot (e.g., SNAP1) of the source device (e.g., denoted by PENDING ACTIVATE INDICATOR/BIT of source device=set/ready) has already been received and further an activate command/system call to activate the prior snapshot (e.g., SNAP1 of the source device) has already been received (e.g., denoted by ACTIVATION INDICATOR for cache slot/pairs including the source device=set/ready). If both conditions of S130 evaluate to true, the "then" processing of steps S131, S132 and S133 may be performed. Step S131 is similar to S121 discussed above. S131 includes performing snapshot activation processing on-demand for the prior snapshot (e.g., SNAP1) of the source device. From step S131, control proceeds to step S132 to clear the pending activate indicator/bit for the source device. S132 is similar to S122 discussed above. From S132, control proceeds to S133 to perform create snapshot processing for the particular snapshot (e.g., SNAP2) for which the snapshot command/system call is received which triggered performing 1400. Consistent with discussion above, S133 may include performing either 1020a processing if no cache slot handle is specified with the call that triggered performing 1400 (e.g., to create SNAP1), or otherwise performing 1020b processing if there is a cache slot handle specified with the call that triggered performing 1400 (e.g., to create SNAP1).

If S130 evaluates to false, the "else" processing of step S134 is performed. Step S134 is similar to S133 discussed above.

Various embodiments discussed herein may be combined with each other in appropriate combinations in connection with the system described herein. Additionally, in some instances, the order of steps in the flow diagrams, flow diagrams and/or described flow processing may be modified, where appropriate. Further, various aspects of the system described herein may be implemented using software, hardware, a combination of software and hardware and/or other computer-implemented modules or devices having the described features and performing the described functions. The system may further include a display and/or other computer components for providing a suitable interface with a user and/or with other computers.

Software implementations of the system described herein may include executable code that is stored in a non-transitory computer-readable medium and executed by one or more processors. The computer-readable medium may include volatile memory and/or non-volatile memory, and may include, for example, a computer hard drive, ROM, RAM, flash memory, portable computer storage media such as a CD-ROM, a DVD-ROM, a flash drive or other drive with, for example, a universal serial bus (USB) interface, and/or any other appropriate tangible or non-transitory computer-readable medium or computer memory on which executable code may be stored and executed by a processor. The system described herein may be used in connection with any appropriate operating system.

While the invention has been disclosed in connection with preferred embodiments shown and described in detail, their modifications and improvements thereon will become readily apparent to those skilled in the art. Accordingly, the spirit and scope of the present invention should be limited only by the following claims.

What is claimed is:

1. A method of providing snapshots of logical devices comprising:
    receiving a first request to create a first snapshot of a logical device;
    responsive to the first request, performing first processing including storing first information in a cache slot, the first information identifying the first snapshot and the logical device used as a source of the first snapshot;
    receiving a second request to activate one or more snapshots, including the first snapshot, identified by information stored in the cache slot;
    responsive to receiving the second request, performing second processing including initiating execution of an asynchronous process that performs snapshot activation processing for the one or more snapshots identified by the cache slot;
    prior to receiving the second request, receiving a third request to create a second snapshot of a second logical device, the third request identifying the handle to the cache slot; and
    responsive to the third request, performing third processing including:
        performing create processing for the second snapshot;
        setting a pending activate indicator associated with the second snapshot and the second logical device; and
        storing second information in the cache slot, the second information identifying the second snapshot and the second logical device used as a source of the second snapshot.

2. The method of claim 1, wherein, while performing said second processing, no writes are allowed to any logical device identified in the cache slot as a source logical device of one of the one or more snapshots.

3. The method of claim 2, wherein said second processing includes setting an activation indicator for the cache slot indicating that a request has been received to activate the one or more snapshots identified in the cache slot.

4. The method of claim 3, wherein the first processing includes:
    obtaining the cache slot;
    performing create processing for the first snapshot;
    setting a pending activate indicator associated with the first snapshot and the first logical device;
    performing said storing first information in the cache slot; and
    returning a handle to the cache slot.

5. The method of claim 4, wherein the asynchronous process that performs snapshot activation processing for the one or more snapshots identified by the cache slot traverses a list identifying the one more snapshots and performs activation processing for each of the one or more snapshots having its associated pending activate indicator set thereby denoting that activation processing has not been completed for said each snapshot.

6. The method of claim 5, further comprising:
    receiving a first write that writes first data to a first location of the logical device, wherein the first write is received after completing the first processing and the second processing;
    determining whether the pending activate indicator associated with the logical device is set and determining whether the activate indicator, of the cache slot identifying the logical device and the first snapshot, is set;
    responsive to determining that the pending activate indicator associated with the logical device is set and that the activate indicator, of the cache slot identifying the logical device and the first snapshot, is set, performing other processing including snapshot activation processing that activates the first snapshot.

7. The method of claim 6, wherein the other processing includes:
    clearing the pending activate indicator associated with the logical device and the first snapshot; and
    performing additional write processing with respect to the first write.

8. The method of claim 7, wherein the additional write processing includes:
    determining whether to save existing data stored at the first location of the logical device prior to writing the first data to the first location;
    responsive to determining to save existing data stored at the first location of the logical device, storing the existing data in a replication data pointers structure along with existing sequence number identifying a particular version of data stored at the first location; and
    writing the first data to the first location once the existing data has been stored in the replication data pointer structure associated with the first location of the logical device.

9. The method of claim 8, wherein said create processing for the first snapshot includes:
    reserving a first entry for the first snapshot in a snapshot table for the first device; and
    storing a first snapshot identifier in the first entry said first identifier identifying the first snapshot.

10. The method of claim 9, wherein a device sequence number is maintained for the logical device, the device sequence number being incremented for each new snapshot activated for the logical device, and wherein the snapshot activation processing that activates the first snapshot includes:
    incrementing the device sequence number associated with the first device; and
    storing the incremented device sequence number for the first device as a sequence number in the first entry to denote a value of the device sequence number at a time when the first snapshot is activated.

11. A system comprising:
    at least one processor; and
    a memory comprising code stored thereon that, when executed, performs a method of providing snapshots of logical devices comprising:
        responsive to the first request, performing first processing including storing first information in a cache slot, the first information identifying the first snapshot and the logical device used as a source of the first snapshot;

receiving a second request to activate one or more snapshots, including the first snapshot, identified by information stored in the cache slot;

responsive to receiving the second request, performing second processing including initiating execution of an asynchronous process that performs snapshot activation processing for the one or more snapshots identified by the cache slot;

prior to receiving the second request, receiving a third request to create a second snapshot of a second logical device, the third request identifying the handle to the cache slot; and responsive to the third request, performing third processing including:
  performing create processing for the second snapshot;
  setting a pending activate indicator associated with the second snapshot and the second logical device; and
  storing second information in the cache slot, the second information identifying the second snapshot and the second logical device used as a source of the second snapshot.

12. A non-transitory computer readable medium comprising code stored thereon that, when executed, performs a method of providing snapshots of logical devices comprising:
  receiving a first request to create a first snapshot of a logical device;
  responsive to the first request, performing first processing including storing first information in a cache slot, the first information identifying the first snapshot and the logical device used as a source of the first snapshot;
  receiving a second request to activate one or more snapshots, including the first snapshot, identified by information stored in the cache slot;
  responsive to receiving the second request, performing second processing including initiating execution of an asynchronous process that performs snapshot activation processing for the one or more snapshots identified by the cache slot;
  prior to receiving the second request, receiving a third request to create a second snapshot of a second logical device, the third request identifying the handle to the cache slot; and
  responsive to the third request, performing third processing including:
    performing create processing for the second snapshot;
    setting a pending activate indicator associated with the second snapshot and the second logical device; and
    storing second information in the cache slot, the second information identifying the second snapshot and the second logical device used as a source of the second snapshot.

13. The non-transitory computer readable medium of claim 12, wherein, while performing said second processing, no writes are allowed to any logical device identified in the cache slot as a source logical device of one of the one or more snapshots.

14. The non-transitory computer readable medium of claim 13, wherein said second processing includes setting an activation indicator for the cache slot indicating that a request has been received to activate the one or more snapshots identified in the cache slot.

15. The non-transitory computer readable medium of claim 14, wherein the first processing includes:
  obtaining the cache slot;
  performing create processing for the first snapshot;
  setting a pending activate indicator associated with the first snapshot and the first logical device;
  performing said storing first information in the cache slot; and
  returning a handle to the cache slot.

16. The non-transitory computer readable medium of claim 15, wherein the asynchronous process that performs snapshot activation processing for the one or more snapshots identified by the cache slot traverses a list identifying the one more snapshots and performs activation processing for each of the one or more snapshots having its associated pending activate indicator set thereby denoting that activation processing has not been completed for said each snapshot.

17. The non-transitory transitory computer readable medium of claim 16, wherein the method further comprises:
  receiving a first write that writes first data to a first location of the logical device, wherein the first write is received after completing the first processing and the second processing;
  determining whether the pending activate indicator associated with the logical device is set and determining whether the activate indicator, of the cache slot identifying the logical device and the first snapshot, is set;
  responsive to determining that the pending activate indicator associated with the logical device is set and that the activate indicator, of the cache slot identifying the logical device and the first snapshot, is set, performing other processing including snapshot activation processing that activates the first snapshot.

18. The non-transitory computer readable medium of claim 17, wherein the other processing includes:
  clearing the pending activate indicator associated with the logical device and the first snapshot; and
  performing additional write processing with respect to the first write; and
wherein the additional write processing includes:
  determining whether to save existing data stored at the first location of the logical device prior to writing the first data to the first location;
  responsive to determining to save existing data stored at the first location of the logical device, storing the existing data in a replication data pointers structure along with existing sequence number identifying a particular version of data stored at the first location; and
  writing the first data to the first location once the existing data has been stored in the replication data pointer structure associated with the first location of the logical device.

* * * * *